US012569990B2

(12) United States Patent
Mocanu

(10) Patent No.: US 12,569,990 B2
(45) Date of Patent: Mar. 10, 2026

(54) SYSTEM OF ROBOTS AND ROBOTIC PARTS INCLUDING METHOD OF CONSTRUCTION AND METHOD OF USE

(71) Applicant: Calin Mocanu, Greater London (GB)

(72) Inventor: Calin Mocanu, Greater London (GB)

( * ) Notice: Subject to any disclaimer, the term of this patent is extended or adjusted under 35 U.S.C. 154(b) by 257 days.

(21) Appl. No.: 18/325,998

(22) Filed: May 31, 2023

(65) Prior Publication Data

US 2024/0227182 A1 Jul. 11, 2024

(51) Int. Cl.
*B25J 9/16* (2006.01)
*B25J 15/08* (2006.01)
(52) U.S. Cl.
CPC .............. *B25J 9/1633* (2013.01); *B25J 15/08* (2013.01)
(58) Field of Classification Search
CPC ...... B25J 9/1633; B25J 15/08; B25J 15/0009; B25J 13/085; B25J 13/081; G05B 2219/39531; G05B 2219/40606
See application file for complete search history.

(56) References Cited

U.S. PATENT DOCUMENTS

| | | | | |
|---|---|---|---|---|
| 4,655,524 | A | * | 4/1987 | Etzel .................. H01R 13/2414 |
| | | | | 439/71 |
| 5,375,021 | A | | 12/1994 | Boeckner |
| 7,295,189 | B2 | | 11/2007 | Ostergard |
| 7,595,788 | B2 | | 9/2009 | Son |
| 7,609,178 | B2 | | 10/2009 | Son |
| 8,075,502 | B2 | | 12/2011 | Parks |
| 8,373,672 | B2 | | 2/2013 | Wallace |
| 8,627,716 | B2 | | 1/2014 | Son |

| | | | |
|---|---|---|---|
| 9,075,095 | B2 | 7/2015 | Kallassi |
| 9,599,451 | B2 | 3/2017 | Ullmann |
| 9,603,240 | B2 | 3/2017 | Cok |
| 9,682,856 | B2 | 6/2017 | Whitesides |
| 9,762,235 | B2 | 9/2017 | Stone |
| 9,921,679 | B2 | 3/2018 | Son |
| 10,115,421 | B2 | 10/2018 | Vijay |
| 10,259,122 | B2 * | 4/2019 | Odhner .................. B25J 15/024 |
| 10,292,268 | B2 | 5/2019 | Shui |

(Continued)

FOREIGN PATENT DOCUMENTS

| | | | | |
|---|---|---|---|---|
| EP | 3534121 | B1 * | 1/2021 | ............... G01D 5/16 |
| GB | 2328752 | A | 3/1999 | |

(Continued)

OTHER PUBLICATIONS

Miyashita, Shuhei, et al; Self-Folding Printable Elastic Electric Devices: Resistor, Capacitor, and Inductor, Distributed Robotics Laboratory at CSAIL, MIT.
techbriefs.com; Rotary Series Elastic Actuator; Lyndon B. Johnson Space Center, Houston, Texas, Aug. 1, 2014.
Reher, Jacob, et al; Dynamic Walking with Compliance on a Cassie Bipedal Robot; 1019 18th European Control Conference (ECC), Napoli, Italy, Jun. 25-28, 2019.

(Continued)

*Primary Examiner* — Stephen A Vu
(74) *Attorney, Agent, or Firm* — The Inventor's Friend Patent Law Firm, P.L.L.C.; Nathaniel A. Wickliffe

(57) ABSTRACT

A robotic component can include a Flexible Circuit Board (FCB) that can be bent into various shapes throughout the robotic component. The FCB can include various integrated sensors that can be manufactured as part of the FCB in a way that reduces the size and number of connections. The FCB can include capacitive force sensors that can measure a quantity of force and can be unitary with the FCB and can be manufactured by folding two electrodes around a compressible dielectric pad.

19 Claims, 21 Drawing Sheets

(56) References Cited

U.S. PATENT DOCUMENTS

| | | | |
|---|---|---|---|
| 10,389,355 B2 | 8/2019 | Stone | |
| 10,908,034 B2 | 2/2021 | Moriura | |
| 11,104,012 B2 | 8/2021 | Cordoba | |
| 11,413,760 B2 * | 8/2022 | Paulson | ........... G01D 5/24 |
| 2004/0246681 A1 * | 12/2004 | Belady | .......... H05K 1/144 |
| | | | 257/E23.101 |
| 2007/0164446 A1 * | 7/2007 | Hawk | ........ H01L 23/4334 |
| | | | 257/E23.092 |
| 2008/0296057 A1 * | 12/2008 | Dudnikov, Jr. | ...... H05K 1/0257 |
| | | | 174/250 |
| 2013/0238129 A1 * | 9/2013 | Rose | ........... B25J 19/0029 |
| | | | 700/258 |
| 2017/0250687 A1 | 8/2017 | Stone | |
| 2017/0336019 A1 | 11/2017 | Liu | |
| 2019/0182960 A1 | 6/2019 | Ahn | |
| 2021/0310834 A1 | 10/2021 | Coyne | |

FOREIGN PATENT DOCUMENTS

| | | | |
|---|---|---|---|
| JP | 2013178241 A | 9/2013 |
| JP | 2014211347 A | 11/2014 |
| WO | 2019138153 A1 | 7/2019 |

OTHER PUBLICATIONS

Ruppert, Felix and Badri-Sprowitz, Alexaner; Series Elastic Behavior of Biarticular Muscle-Tendon Structure in a Robotic Leg; Frontiers in Neurorobotics; Aug. 13, 2019, vol. 13—2019, frontiersin. org; https://doi.org/10.3389/fn-bot.2019.00064.

Bolignari, Marco, et al; Diaphragm Ankle Actuation for Efficient Series Elastic Legged Robot Hopping; https://arxiv.org/pdf/2203. 01595.pdf; Mar. 4, 2022.

https://www.robotshop.com/us/es/sensor-fuerza-capacitiva-15-mm-45-n-10-lbs.html.

* cited by examiner

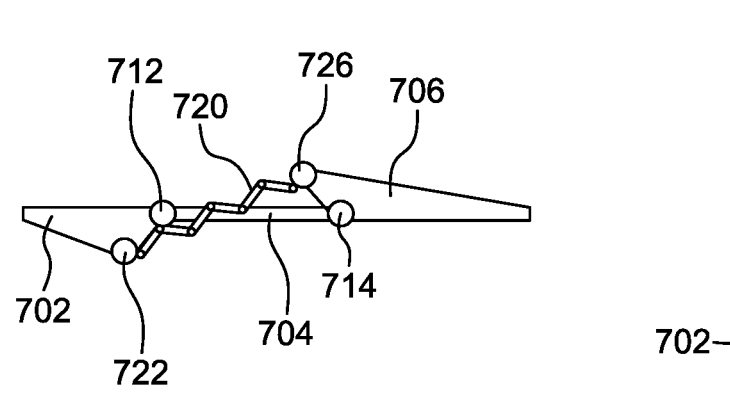
Fig. 7A
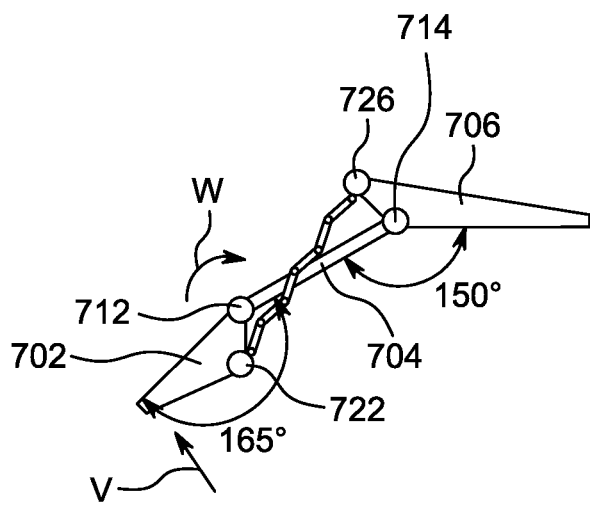
Fig. 7B
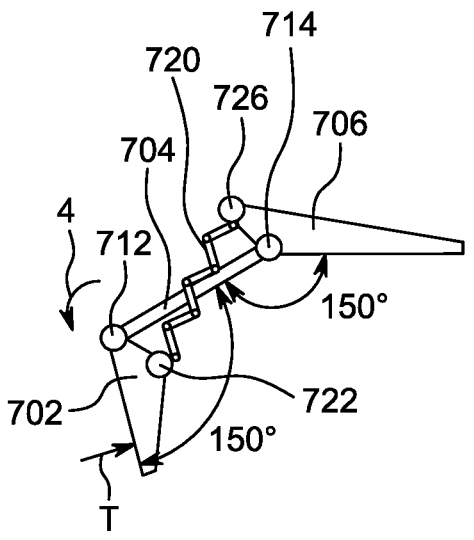
Fig. 7C
Fig. 7D

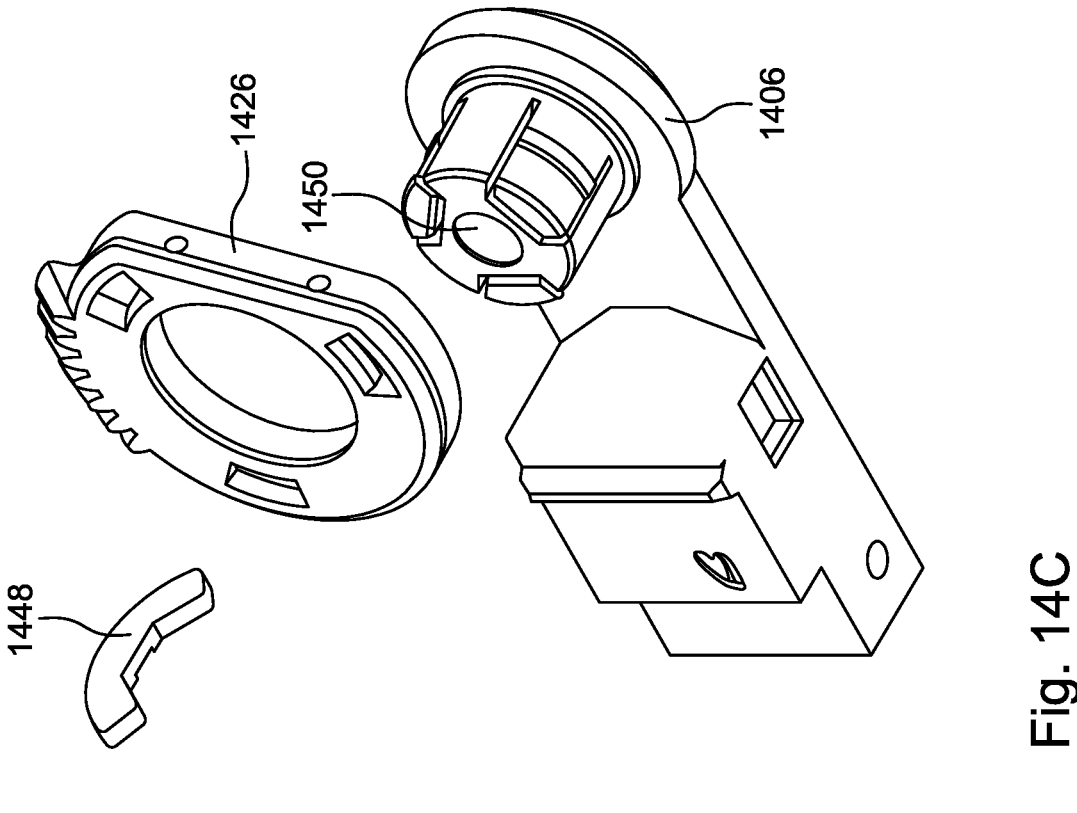
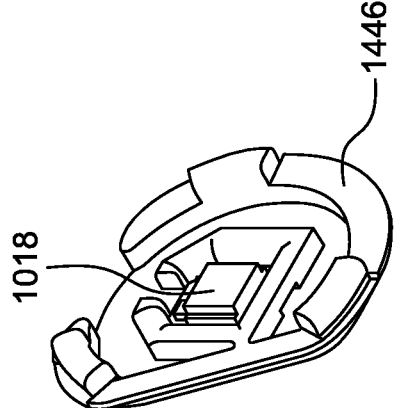
Fig. 14C

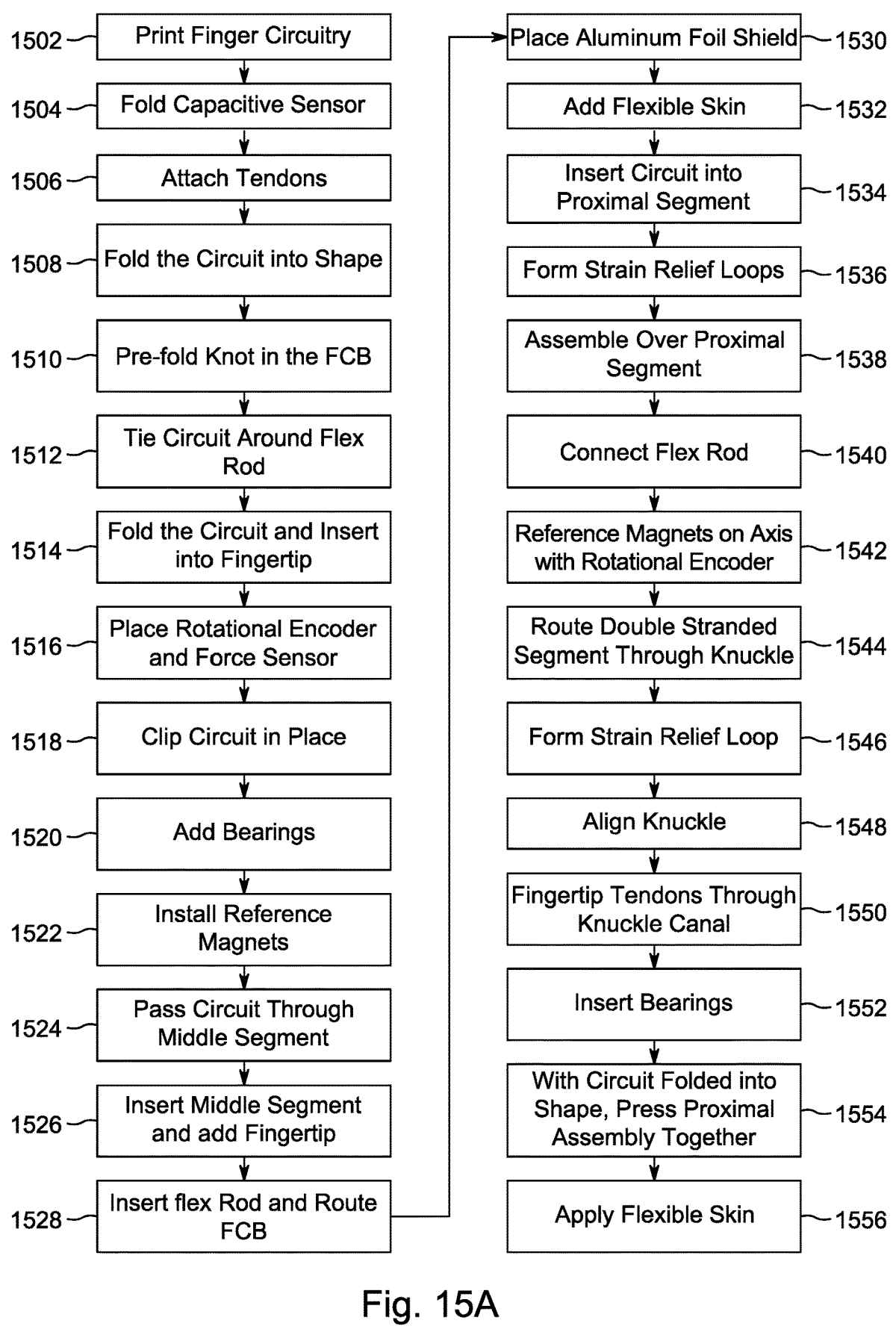

| | | |
|---|---|---|
| 1502 — | Print Finger Circuitry | |
| 1504 — | Fold Capacitive Sensor | |
| 1506 — | Attach Tendons | |
| 1508 — | Fold the Circuit into Shape | |
| 1510 — | Pre-fold Knot in the FCB | |
| 1512 — | Tie Circuit Around Flex Rod | |
| 1514 — | Fold the Circuit and Insert into Fingertip | |
| 1516 — | Place Rotational Encoder and Force Sensor | |
| 1518 — | Clip Circuit in Place | |
| 1520 — | Add Bearings | |
| 1522 — | Install Reference Magnets | |
| 1524 — | Pass Circuit Through Middle Segment | |
| 1526 — | Insert Middle Segment and add Fingertip | |
| 1528 — | Insert flex Rod and Route FCB | |

| | | |
|---|---|---|
| Place Aluminum Foil Shield | — 1530 |
| Add Flexible Skin | — 1532 |
| Insert Circuit into Proximal Segment | — 1534 |
| Form Strain Relief Loops | — 1536 |
| Assemble Over Proximal Segment | — 1538 |
| Connect Flex Rod | — 1540 |
| Reference Magnets on Axis with Rotational Encoder | — 1542 |
| Route Double Stranded Segment Through Knuckle | — 1544 |
| Form Strain Relief Loop | — 1546 |
| Align Knuckle | — 1548 |
| Fingertip Tendons Through Knuckle Canal | — 1550 |
| Insert Bearings | — 1552 |
| With Circuit Folded into Shape, Press Proximal Assembly Together | — 1554 |
| Apply Flexible Skin | — 1556 |

Fig. 15A

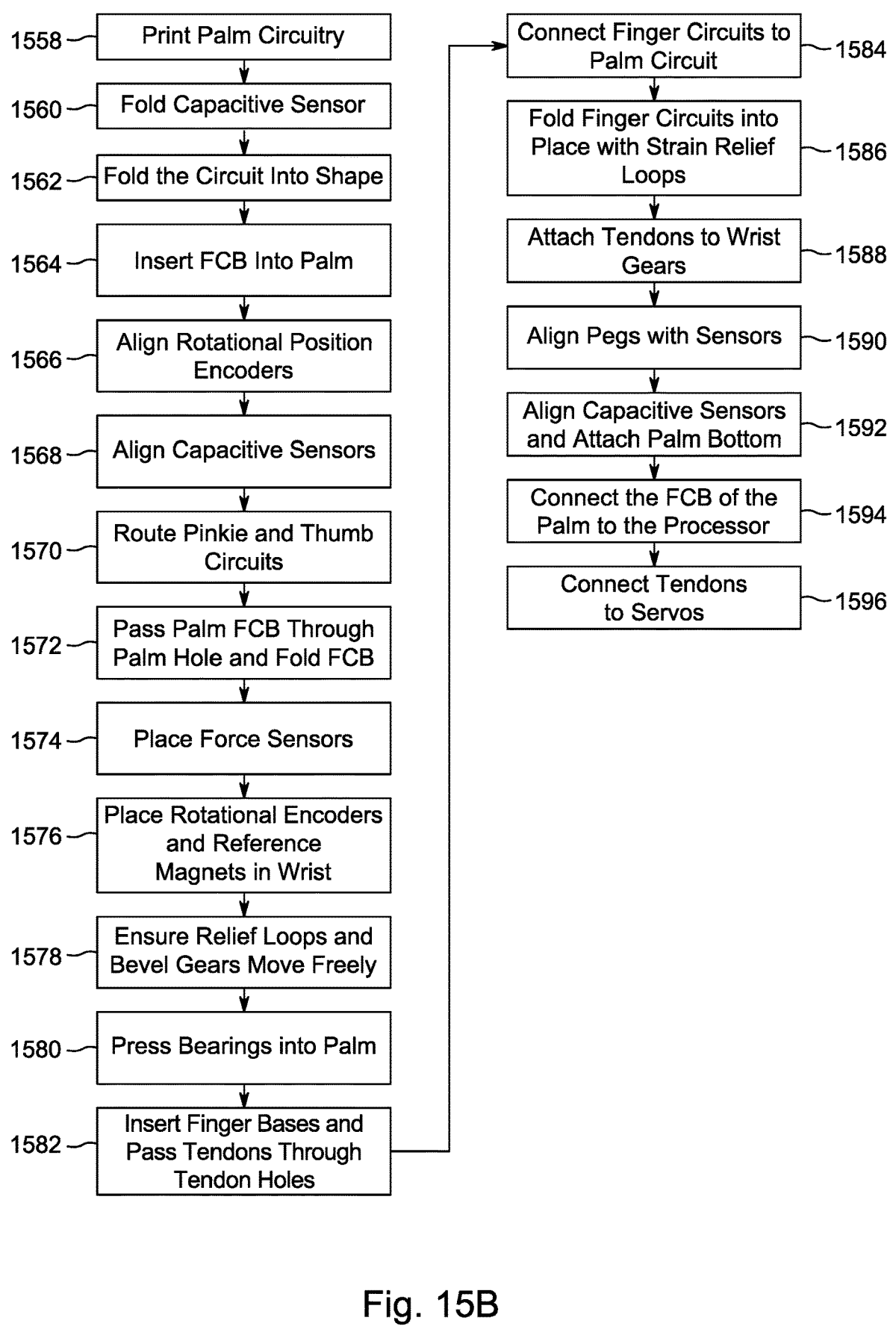

1558 — Print Palm Circuitry

1560 — Fold Capacitive Sensor

1562 — Fold the Circuit Into Shape

1564 — Insert FCB Into Palm

1566 — Align Rotational Position Encoders

1568 — Align Capacitive Sensors

1570 — Route Pinkie and Thumb Circuits

1572 — Pass Palm FCB Through Palm Hole and Fold FCB

1574 — Place Force Sensors

1576 — Place Rotational Encoders and Reference Magnets in Wrist

1578 — Ensure Relief Loops and Bevel Gears Move Freely

1580 — Press Bearings into Palm

1582 — Insert Finger Bases and Pass Tendons Through Tendon Holes

1584 — Connect Finger Circuits to Palm Circuit

1586 — Fold Finger Circuits into Place with Strain Relief Loops

1588 — Attach Tendons to Wrist Gears

1590 — Align Pegs with Sensors

1592 — Align Capacitive Sensors and Attach Palm Bottom

1594 — Connect the FCB of the Palm to the Processor

1596 — Connect Tendons to Servos

Fig. 15B

SYSTEM OF ROBOTS AND ROBOTIC PARTS INCLUDING METHOD OF CONSTRUCTION AND METHOD OF USE

FIELD OF THE INVENTION

This application relates to the design and construction of robotic parts, and more particularly, improvements in functionality and improvements in compact designs for robotic parts.

BACKGROUND OF THE INVENTION

Humans have been trying to create robots for decades, but with only limited success. Robotic parts such as arms, wrists, and hands suffer from a number of drawbacks and limitations. One of the drawbacks in the field of robotics currently is a limitation on the ability to reduce the size of various features.

As an example, small jointed parts like fingers need to carry numerous sensors, such as pressure sensors joint position sensors, etc. And, in addition to the sensor itself, each sensor has various wires, wiring harnesses, connectors, etc. that must be carried through the fingers, including tight places like knuckle joints. As used herein, the term "wire" can refer to single strands or multiple-strand wires that are insulated with insulating material surrounding the conductive strand(s). The insulating material around the strand is flexible, and the strand with the insulation around it can be bent into various paths throughout an electronic device. However, the strand plus the insulating material around it that form a wire can become bulky when multiple wires are used in the same device or routed along the same path. The terms "wiring harness" can refer to physical connectors that allows two insulated wires to be connectively joined to form a single electric conductor through the use of Newtonian force, including connectors that can connect multiple sets of insulated wires at the same time. Wire harnesses are typically made of insulated metal wires that must be attached to connectors on both sides. The wire harness can then be plugged into corresponding connectors on two circuits, connecting them electrically. This requires that both wires have a connector or harness. These harnesses or connectors can be clips mounted at the end of the conductive strands so that a user can forcefully engage two clips or other connectors together to form a conductive strand that conducts electricity and electric signals through the clip from one strand to the other, thereby forming a single conductive path. To join two wires into a single conductive path, a wiring harness must be applied to both wires, which can be a costly and difficult step in manufacturing as the insulation must be stripped from the end of the wire, the wire must be connected to the harness, etc. For each connection end the electrical insulation must be stripped, then the wire is crimped into pins, then the pins must be inserted into the plastic male connector. This must be done for every end of every wire.

These connections where the end of the wire is connected to a wiring harness create a weak point along the electrical path, and as the wire is flexed back and forth repeatedly in normal usage, the wire is most likely to break at the connection with the wiring harness that allows the two wires to be joined. The places where the wires connect to the harnesses tend to see the most stress, and the wires tend to fail at the places where they are connected to the harnesses. Furthermore, after the two harnesses are linked together, they take up a large amount of space inside the device. When this is multiplied by a large number of wires, the result is either a large number of bulky wires and wiring harnesses that must take up space, or a smaller number of larger multi-wire harnesses that take up more space.

A highly functional robot finger would ideally be able to sense pressure at the tip of the finger, the back of the finger, both sides of the finger, and of course, the inner finger pad where the finger makes contact with an object being gripped by the robot's hand. However, this requires a multitude of bulky sensors, wires, wiring harnesses, and circuit connectors, that must all be packed into a small finger, while also allowing the finger to bend and move. This means that parts such as fingers must be at least a minimum size that is often larger that desired for various applications. Furthermore, as the manufacturer attempts to reduce the overall size of the finger to the minimum size capable of carrying all of the necessary components, the space inside the finger gets more and more crowded, and therefore more and more difficult for the manufacturer to assemble all of the components inside of the tight space. All of this contributes to ever increasing costs as manufacturers attempts to reduce the size of various parts given the constraints of current technology.

In some cases, in order to reduce the size of the fingers, it has been necessary to reduce the number of sensors, the quality of sensors, and/or the types of sensors. This means that there is often a direct correlation between decreasing size of parts such as fingers and decreasing functionality. Manufacturers may also reduce the quality or strength of other parts such as fingers and wrists in order to allow for decreased size, but this decreases in quality, such as decreasing the robustness of hinges and hinged parts, results in inferior products that break easily.

In some cases, the size has been reduced by attempting to remove some components such as sensors from tight parts such as fingers. This can be reducing the number of pressure sensors, but can also mean attempting to measure certain variables such as fingertip position from alternate locations outside of the fingertip. For example, some manufacturers have attempted to measure finger position by placing magnets in the finger tips, and then sensing the proximity of the magnet to other parts such as a palm of a robotic hand. Moving the sensing activity to the palm means there is more space for these sensors. However, this also results in a significant reduction in quality. Placing magnets in the fingertips can have an effect on the robot's ability to grasp and release magnetic objects, but even worse, grasping and releasing magnetic objects will interfere with the sensor's ability to accurately know where the fingertips are positioned. Furthermore, although ample space may exist in a palm area, magnets in the fingertips take up valuable space used for pressure sensors and may interfere with the remaining pressure sensors.

Other manufacturers have attempted to measure position by monitoring the positions of servos in the arm that control the fingers through tendons. However, this can be extremely unreliable. The tendons that connect to the finger tips can stretch over time, resulting in inaccurate readings, and as the tendons pass through the narrow and crowded finger knuckles, even slight interactions with other components such as wires and wire harnesses can lead to inaccurate results. As wires and wiring harnesses interfere with the path of the tendons, the length of tendon does not exactly correlate to finger position. In the state of the current technology, measuring the position of the fingers by monitoring the rotational position of the servos in the arm that drive the fingers is the best option, given that the measuring can occur outside of the finger and reduce the size constraints of a finger, but this method of measuring finger position is prone to inaccuracy.

Various other means also exist for more accurately measuring the rotational position of the joints, and therefore the position of the fingertip, or wrist, or arm, etc. However, to date, either these means produce inaccurate results or have not been reduced in size sufficiently to allow their use in a robotic finger knuckle that can be the size of a human finger while also allowing for tendons wires, and wiring harnesses to exist in the same space.

Up to now, there has been a trade off between various aspects, including the quality of sensing, the number of sensors and the amount of sensed data, the size of the finished parts, and the cost to assemble. For example, as size decreases, the quality of components such as sensors and/or the number of sensors decreases and/or the cost of assembly increases. Furthermore, there are hard limits on the ability to reduce size while still maintaining even a minimum level of sensing at any cost. The same can be said about improving the quality and/or number of sensors, which then increases size and cost, and the same can be said about reducing cost which then results in reduced sensing and increased size. Similarly, the quality of parts such as fingers and wrists can be part of the trade-off, and reducing the robustness of components such as hinges and knuckles can allow for reduced size, but with a corresponding reduction in quality. Improving one of these aspects seems to come at the cost of the others.

It would be desirable to have new robotic technology and new components that allow robotic parts such as fingers, wrists, arms, etc. to be reduced in size to the size of human fingers, wrists, arms, etc, or smaller, while also maintaining robust pressure sensing and position sensing, reducing costs, and maintaining strong parts and components. It would be further desirable if the new robotic technology and new parts result in reduced cost of components and reduced cost of assembly while also allowing for reduced size at the same time.

SUMMARY OF THE INVENTION

This invention overcomes disadvantages of the prior art by providing a system and method for manufacturing robotic parts, including parts that can be analogous to fingers, hands and arms. The system and methods described herein include various ways to reduce the cost of manufacturing, reduce the size of manufactured parts, and increase the reliability and quality of sensed data. These improvements include producing capacitive pressure sensors that are simple in construction and can be manufactured by folding a sheet of material over itself to form a sandwich around a double-sided adhesive. These force sensors are simple and cheap to manufacture, and can be connected to cheap touch sensor chips. The sheet of material can also be a Flexible Circuit Board (FCB) that can connect the sensor to other electronic components, including touch sensor chips and processors. The touch sensor chips can be Integrated Chips (IC) that can be integrated on the FCB, and the IC(s) can be located near the force sensors on the FCB. The FCB can also include multiple sensors on the same FCB, so that, for example, multiple sensors in a finger such as finger tip, sides of the finger, back of the finger, etc, can all be manufactured as part of the same FCB, and can all be connected to the touch sensor chip(s) integrated on the FCB. With all of the sensors and circuits manufactured as a single FCB, the finger can be constructed with no wiring harnesses or other bulky connectors to be connected during manufacturing or taking up space inside narrow parts like a finger. The single FCB can then be arranged through a finger, including through narrow joints such as knuckles, and can be tied into place within a finger, held in place with clips, etc, and can connect sensors to a processor with very little space requirements, leaving space within a small finger for further components. Because the FCB is free from insulation, there is no rubber or other insulation within the fingers to get caught up on moving parts or prevent tendons from sliding freely. The flex circuit connectors can be printed in the same process required to make the circuit board. The connectors can be electrical traces as any other on the FCB, with exposed and plated pads on the end, using the same process used to make the pads of most components on the circuit board. The flex circuit can then be directly inserted into the female connector on the palm. The connector can also be thinner because the flex circuit is thinner than wire connectors.

Additionally, sensors such as rotational position sensors, also referred to as rotational encoders, can be configured to be integrated with the FCB, thereby eliminating the need for additional wires, wire harnesses, and other connectors. These rotational position sensors can be used to measure the rotational position of hinged joints such as finger knuckles. These sensors can utilize the Hall effect to measure the orientation of a diametrically magnetized magnet that can be assembled in a stack with the axis of the magnet on the same axis as the knuckles or other hinges. This approach with stacking a disc shaped magnet and rotational position encoder on axis with the knuckle hinge allows for a small and flat rotational sensor that takes up little space while still reporting rotational position with accuracy. The rotational sensor can also be configured to integrate with the FCB to provide measured data to the processor without the need for additional wiring. The space savings that result from the innovative design of this sensor combined with the space savings that result from the FCB replacing traditional connection types allows for the use of on-axis hall sensors which are significantly more accurate than prior art position sensors for robotic parts.

The use of this precise on-axis rotational position sensor also allows for the use of a 4-bar linkage system for torque sensing. The 4-bar linkage torque sensing system can allow a processor to calculate the pressure being applied to a held object by a finger. A processor can measure minute divergence, or flexing, of finger components by measuring and comparing the rotational position at multiple joints at the same time. As applied pressure increases, so too does the flex in certain components, which can be determined by measuring the rotational positions of multiple joints at the same time. The applied pressure can be determined from the amount of flex. Calculating the applied pressure when a fingertip is in contact with an object means that a pressure sensor such as a capacitive pressure sensor does not need to be used at the fingertip, thereby further reducing the space requirements in the finger while also decreasing production cost.

In an embodiment, a robotic component can include a FCB that can include at least one capacitive force sensor, the capacitive force sensor being unitary with the FCB, and the capacitive force sensor having two electrodes folded around a compressible dielectric pad, and at least one rotational position encoder, the rotational position encoder being on the FCB as an Integrated Chip (IC), and at least one magnet, the at least one magnet being embedded in a joint of the robotic component so that the at least one magnet and the at least one rotational position encoder are on-axis with the joint, so that the rotational position encoder can determine the rotational position of the magnet within the joint.

The FCB can include at least one strain relief loop that passes around a loop holder within the robotic component. The FCB can include at least one bending segment, the bending segment allowing the FCB to be folded into multiple planes. The at least one rotational position encoder can include at least two rotational position encoders, and wherein the FCB can be bent so that a first rotational position encoder is in a first plane and measures a rotational position around a first axis, and a second rotational position encoder is in a second plane and measures a rotational position around a second axis, wherein the first axis and the second axis are in different planes. The FCB can include at least one knot segment, wherein the knot segment is tied in a knot around a support within the robotic component. The joint of the robotic component can have a hollow central canal that passes through the center of the joint, including passing through the rotational axis of the joint, and wherein the FCB passes through the hollow central canal and the rotational axis of the joint. The robotic component can also include a layer of foil between the at least one capacitive sensor and the outside of the robotic component, the layer of foil shielding the capacitive sensors from external capacitance. The robotic component can include a 4-bar linkage system, wherein a motor that powers the movement of one joint will also power the movement of a second joint through the 4-bar linkage, and wherein a linkage bar can be semi-rigid, so that a quantity of force applied to a finger tip can be calculated from the rotational position of the two joints when the linkage bar is flexed under force. The FCB can be tied in a knot around the linkage bar. The joint of the robotic component can have a hollow central canal that passes through the center of the joint, including passing through the rotational axis of the joint, and wherein tendons that control the movement of the robotic component are routed through the hollow central canal and the rotational axis of the joint. The robotic component can have multiple FCBs in different portions of the robotic component, and the multiple FCBs can be connected together by FPC connectors and can be connected free of soldering or wiring harnesses. The FCB can include holes through the FCB and wherein tendons that control the movement of the robotic component can be routed through the holes through the FCB.

BRIEF DESCRIPTION OF THE DRAWINGS

The invention description below refers to the accompanying drawings, of which:

FIG. 7A is a schematic diagram of a 4-bar linkage system that can use magnetic rotational sensors to determine torque and pressure, shown with the finger in a straight conformation, according to an illustrative embodiment;

FIG. 7B is a schematic diagram of the 4-bar linkage system of FIG. 7A, shown with the finger in a bent conformation and without applied pressure, according to an illustrative embodiment;

FIG. 7C is a schematic diagram of the 4-bar linkage system of FIG. 7B, shown with pressure applied to an outer, fingernail side of a finger, thereby flexing the linkage bar in a shortened conformation; according to an illustrative embodiment;

FIG. 7D is a schematic diagram of the 4-bar linkage system of FIG. 7B, shown with pressure applied to an inner side of a finger, thereby flexing the linkage bar in an elongated conformation; according to an illustrative embodiment;

Figure 9:
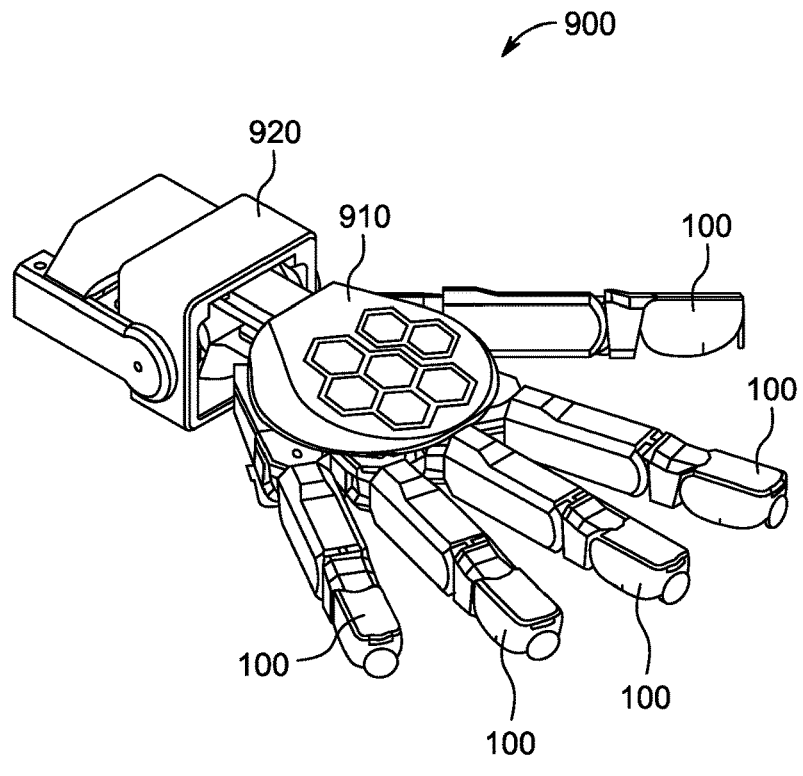
FIG. 9 is a perspective view of an assembled robotic hand, including a wrist, palm, and fingers, according to an illustrative embodiment.
Figure 12B:
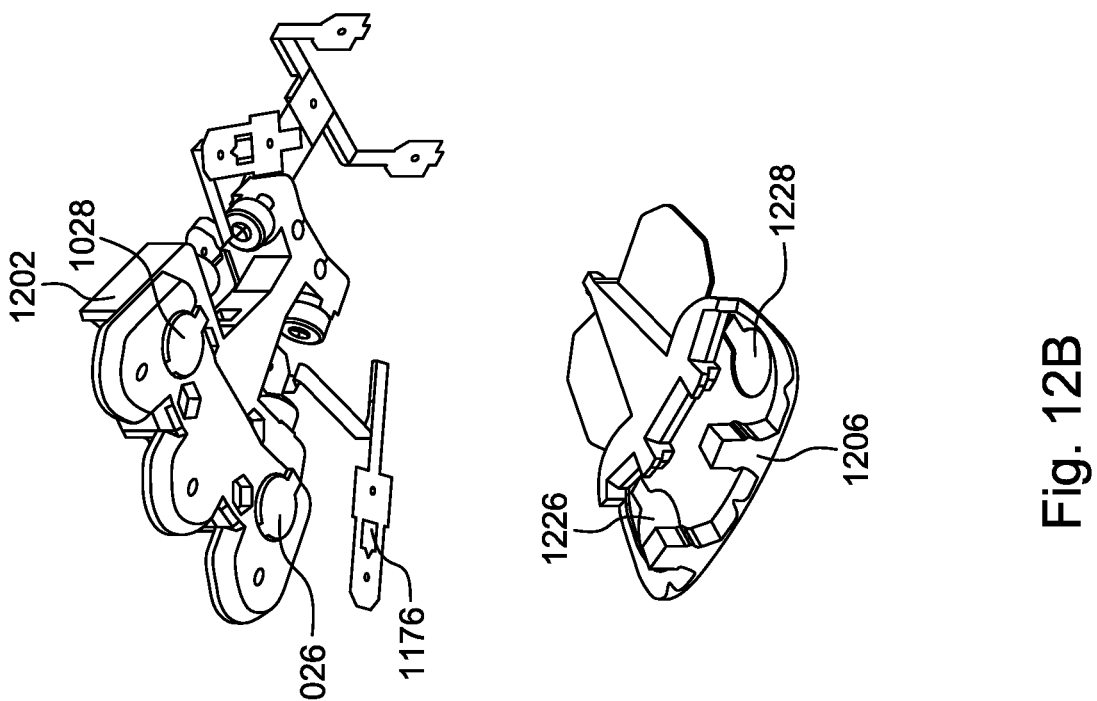
FIG. 12B is an exploded perspective view of a partially assembled palm, showing circuits, sensors, and removed hand bottom cover, according to an illustrative embodiment.
Figure 14A:
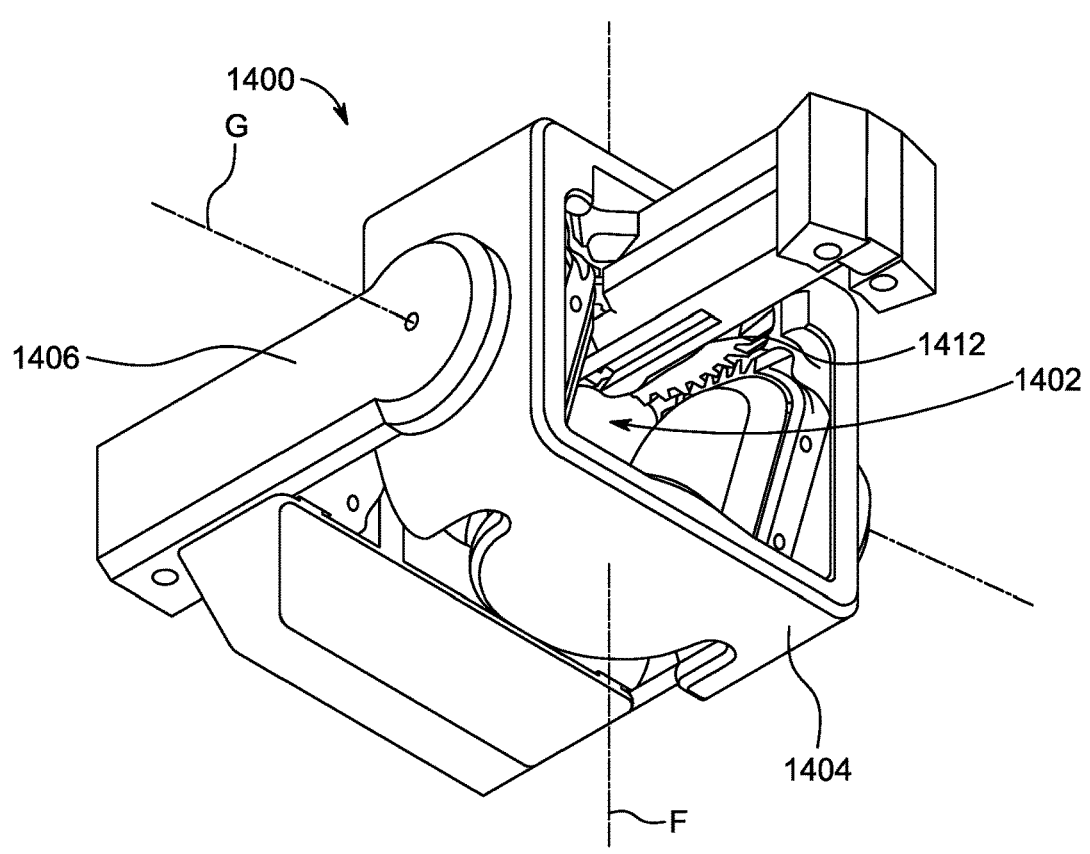
Figure 14B:
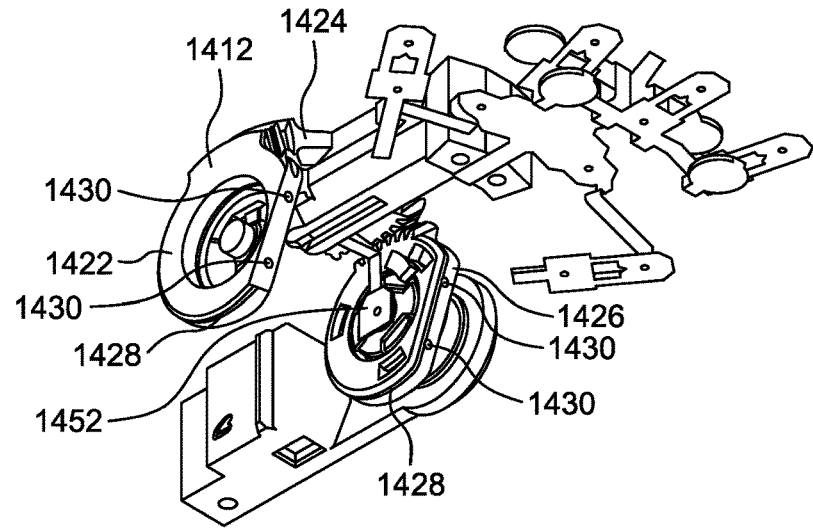
Figure 16:
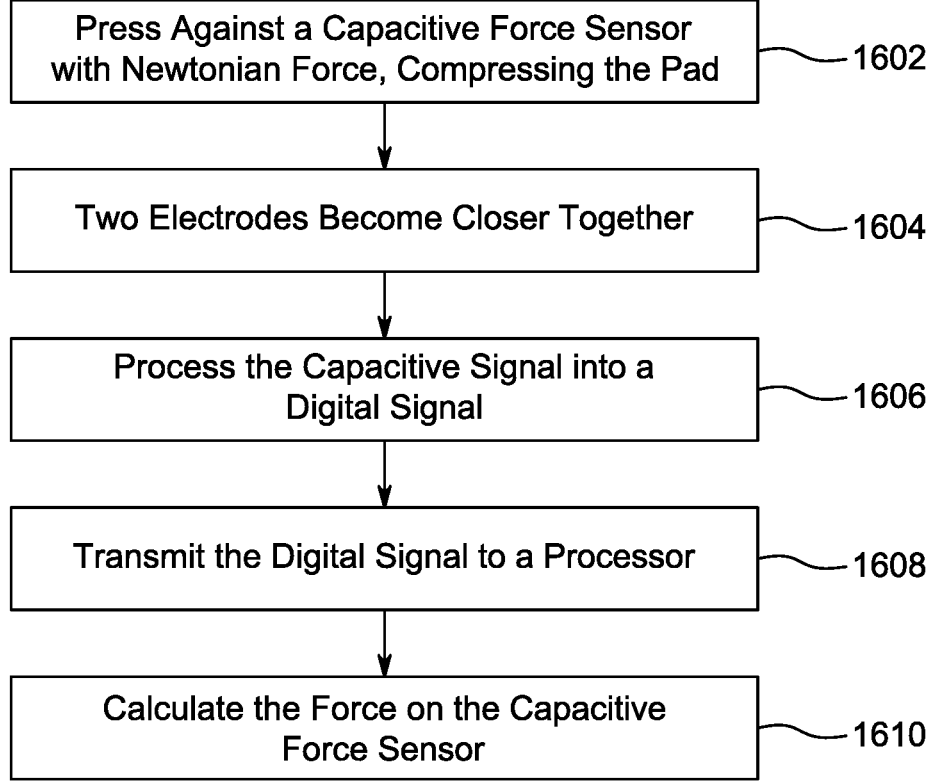
Figure 17:
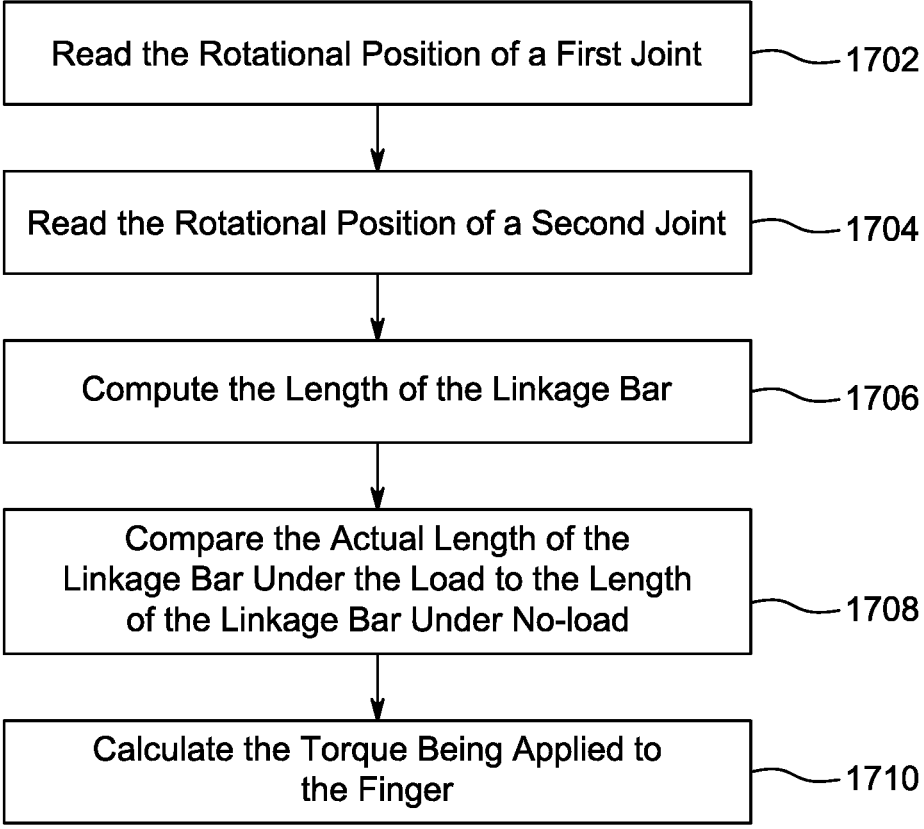
Figure 18:
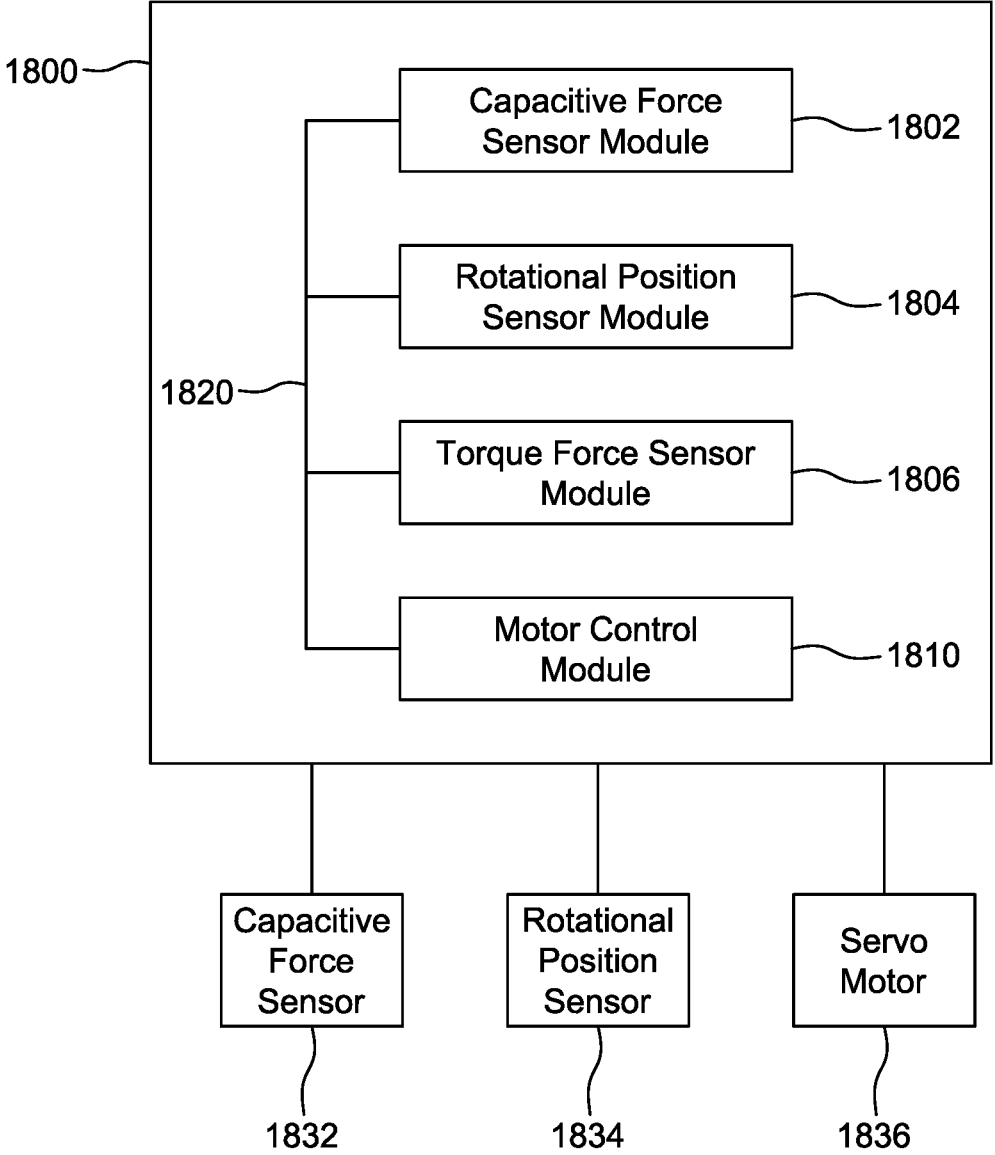

14A is a perspective view of the wrist of FIG. 9, showing the hollow central channel that can accommodate tendons and FCBs, according to an illustrative embodiment;

FIG. 14B is a perspective view of selected components within the palm of FIG. 12B and the wrist of FIG. 14A, showing bevel gear components, according to an illustrative embodiment;

FIG. 14C is an exploded view of the left bevel gear and outer structure of the wrist of FIG. 14B, showing a rotational position sensor; according to an illustrative embodiment;

FIG. 15A is a method of manufacturing a robotic finger, according to an illustrative embodiment;

FIG. 15B is a method of manufacturing a robotic hand, according to an illustrative embodiment;

FIG. 16 is a method of sensing force using a capacitive sensor, according to an illustrative embodiment;

FIG. 17 is a method of sensing force using rotational position sensors, according to an illustrative embodiment; and FIG. 18 is a schematic view of a robot control processor, according to an illustrative embodiment.

DETAILED DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

As used herein, the term robotic finger refers to a robotic part that can include force sensors, joints, joint position sensors, and flexible circuit boards (FCBs). Although the robotic finger described herein is similar in appearance and function to a human finger, the technology described herein is not intended to be limited to human forms. Similarly, as used herein, the terms robotic hand, palm, and wrist refer to robotic parts that include force sensors, joints, position sensors, and FCBs, and although the robotic parts described herein are similar in appearance and function to the human body, the technology described herein is not intended to be limited to human forms.

Figure 1:
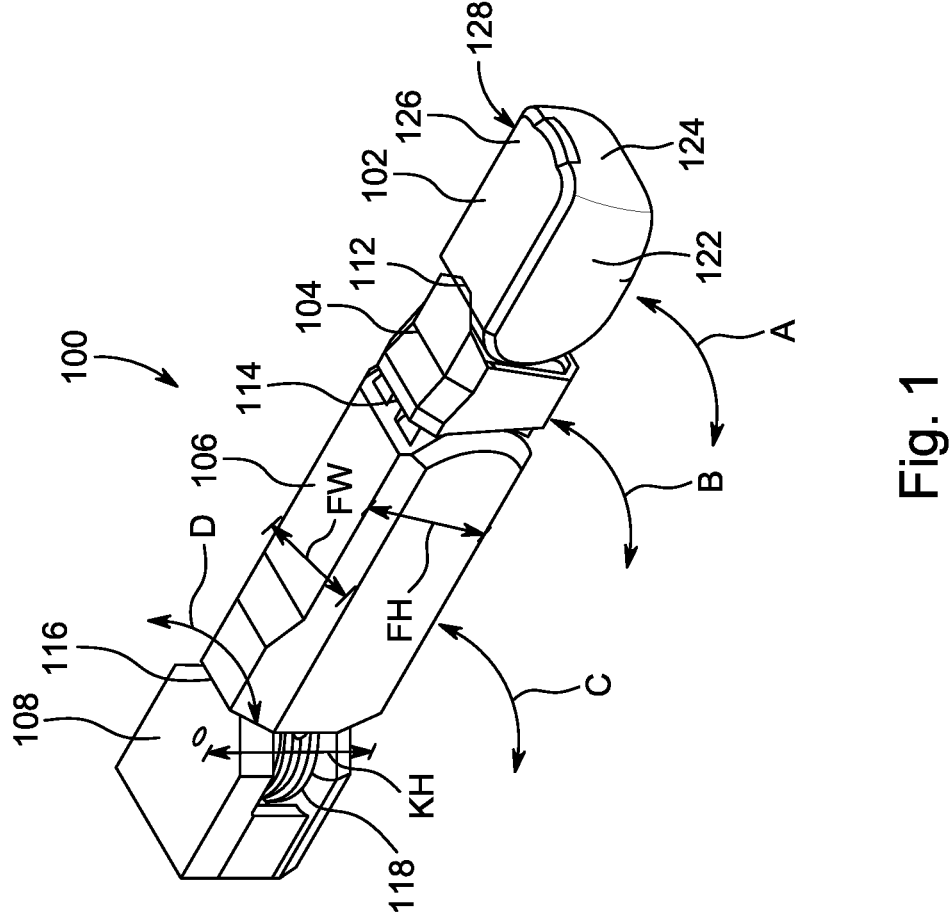
FIG. 1 is a perspective view of a robotic finger, according to an illustrative embodiment.

FIG. 1 is a perspective view of a robotic finger, according to an illustrative embodiment. A robotic finger 100 can have a base 108, and multiple phalange segments including distal phalange 102, middle phalange 104, and proximal phalange 106. Phalanges 102 and 104 can be separated by joint or knuckle 112, and phalanges 104 and 106 can be separated by joint or knuckle 114. Knuckles 112 and 114 can bend or curl inward along arrow A and arrow B, respectively. Phalange 106 and base 108 can be separated by joint 116 that can bend or curl along arrow C, and phalange 106 and base 108 can also be separated by joint 118 that can bend or yaw along arrow D. Joints 116 and 118 allow phalange 106 to move relative to base 108 along two different axis. It should be clear that in various embodiments, larger or smaller numbers of phalanges are possible, with joints between each phalange, and it should be clear that any two phalanges can have one or more than one joint between them thereby allowing for one or more than one axis of movement between any two phalanges.

The design described herein allows for the finger, including joints, to have a very small form factor. In various embodiments, the finger, including joints, can have a maximum width FW of 16 mm or less. In various embodiments, the finger can have a maximum height FH of 18 mm or less. In various embodiments, a finger knuckle can have a maximum knuckle height KH of 20 mm. The reduced size is possible in part due to the absence of wiring and wiring harnesses throughout the finger, along with the compact design for the knuckle rotational position sensors. The finger can be fully functional with capacitive force sensors in four directions, knuckle rotational position sensors, and a torque force sensor, all within the compact design having a maximum finger width of 16 mm, a maximum finger height of 18 mm, and a maximum knuckle height of 20 mm.

In traditional designs, pressure sensors in a finger would require a separate sensor unit for each touch sensitive area, and each pressure sensor unit would have wires extending from the sensor so that each of the sensors can be connected to a controller. In some cases this could include bulky wiring harnesses or connectors. The design described herein has a number of pressure sensitive areas without the need for wires or wiring connectors. The finger 100 shown in FIG. 1 can have four pressure sensors that can sense pressure at pressure sensitive areas 122, 124, 126, and 128, however, different numbers and configurations of pressure sensors are possible.

Figure 2A:
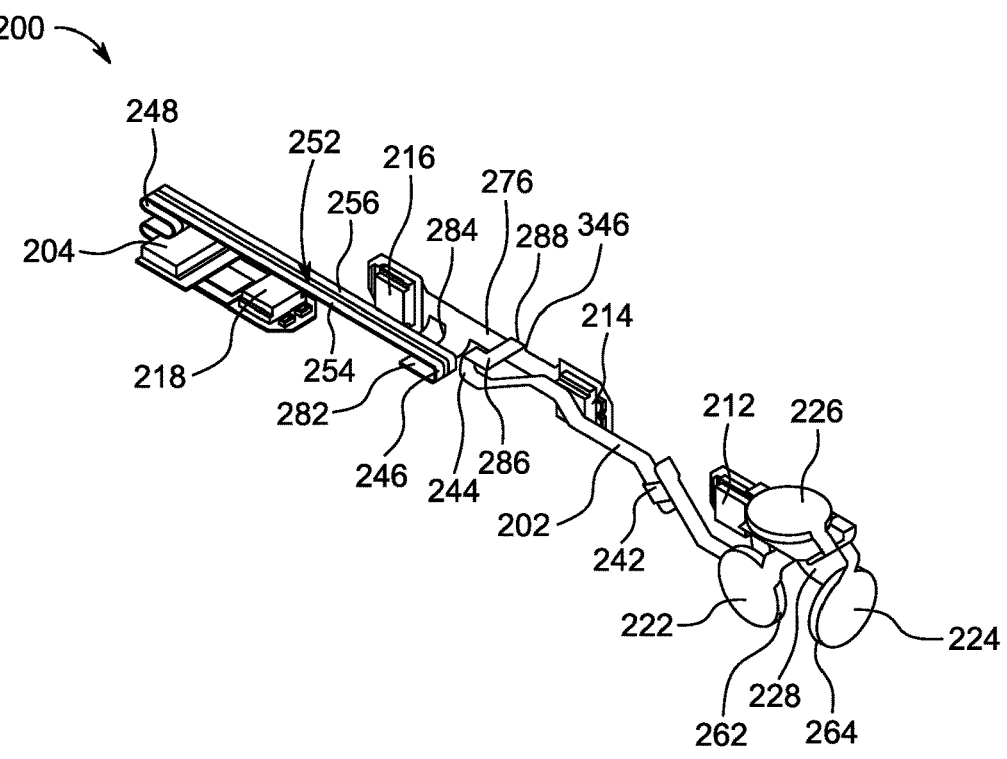
FIG. 2A is an upper perspective view of circuitry, including sensors, from inside the robotic finger of FIG. 1, according to an illustrative embodiment.
Figure 2B:
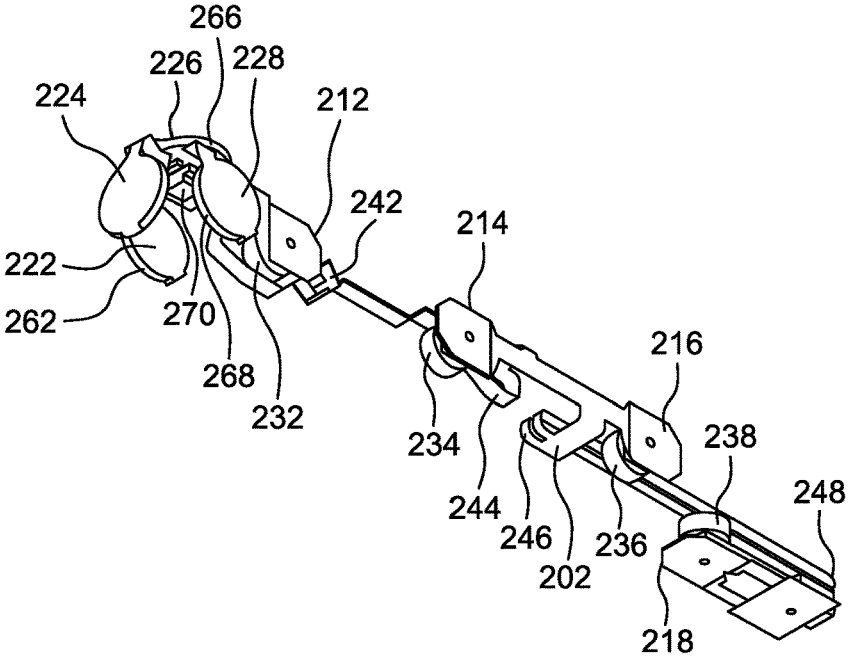
FIG. 2B is a lower perspective view of the circuitry of FIG. 2A also showing the position of knuckle magnets, according to an illustrative embodiment.

FIG. 2A is an upper perspective view of circuitry, including sensors, from inside the robotic finger of FIG. 1, according to an illustrative embodiment, and FIG. 2B is a lower perspective view of the circuitry of FIG. 2A also showing the position of knuckle magnets, according to an illustrative embodiment. Finger circuitry 200 can include a finger FCB 202, finger tip force sensors 222, 224, 226, and 228, and rotational position encoders 212, 214, 216, and 218. As used herein, the terms "rotational position encoder," "rotational encoder," and "contactless potentiometer" can be used interchangeably. Finger tip sensor 226 can sense force on the back of the finger, in a location associated with a fingernail in a corresponding human finger, and finger tip sensor 224 can sense pressure on the distal tip of a finger tip. Finger tip sensor 222 can sense pressure on a first side of the finger, and finger tip sensor 228 can sense pressure on a second side of the finger, opposite from the first side. Although this description describes specific sensors in specific locations, and describes them in the context of similarity to human fingers and human sensing locations, it should be clear that this is merely illustrative, and various numbers and arrangements of sensors are possible.

Rotational position encoder 212 can sense the rotational position of the diametrically magnetized magnet embedded in the knuckle 112, and can therefore detect the rotational position of the knuckle 112. or put another way, can detect the angle of the joint between distal phalange 102 and middle phalange 104. Rotational position encoder 214 can sense the rotational position of knuckle 114 between phalanges 104 and 106. Rotational position encoder 216 can sense the rotational position of knuckle 116 between phalange 106 and base 108 as phalange 106 curls inward toward the palm, and rotational position encoder 218 can sense the rotational position of joint 118 as phalange 106 moves in a yaw direction relative to base 108. A diametrically magnetized magnet, such as diametrically magnetized disc magnet 232, 234, 236, and 238 can be positioned in each joint, and the encoder can detect the rotational position of the magnet. As used herein, the term "diametrically magnetized magnet" refers to a magnet that is magnetized across the diameter, with the poles located on the curved surfaces along the outer circumference of the magnet. The magnets shown in FIG. 2B are shown in proximity to the corresponding rotational encoders, however, it should be clear that the magnets are fixed within the joints and move with the joints relative to the encoders, so that the encoders can detect the rotational position of the magnets, and thereby detect the rotational position of the joints.

Taken together, the rotational position encoder and diametrically magnetized magnet form a rotational position sensor. The rotational position encoder can be an integrated chip (IC) on the FCB that can calculate and digitize the angle. The rotational position encoder can include 4 analog hall effect sensors arranged on the IC of the FCB in a circle around the axis center. The chip can interpolate the analog signals and perform basic trigonometric math right there on the IC. The output of the IC that is the rotational position encoder can be a digital angle, and that digital angle data can be transmitted through traces on the FCB.

The rotational position encoders and the force sensors can be integrated as part of the FCB. Integrating sensors such as sensors 222, 224, 226, and 228, rotational encoders 212, 214, 216, and 218 as part of the FCB allows for a design that is free from insulated wires and wiring harnesses. The FCB can include separate conductive traces for each sensor, including force sensors and rotational position sensors, and can connect each sensor to circuits and processors located outside of the finger without the need for additional connectors or wires within the finger. By having all of the sensors connected to circuits and processors outside of the finger through fine traces on a single FCB, the physical volume of all connections from sensors in the finger to connections outside of the finger is substantially reduced, allowing for much smaller form factor fingers, while also allowing for reduced assembly cost because all rotational encoders and force sensors in a finger can be already pre-manufactured together in a single finger circuit unit 200.

The FCB 202 can be routed through narrow spaces in an articulated finger, including though the narrow spaces inside a joint or knuckle. However, as different joints move and move in different directions, different forces can be exerted on the FCB in different directions. To overcome this problem, a series of strain relief loops can be folded into the FCB, such as strain relief loops 244, 246, and 248. These strain relief loops provide extra slack in the FCB, so that the overall length can lengthen and shorten as necessary, without the FCB getting tangled or getting in the way of other components. The loops can be wrapped around loop-holders (not shown) throughout the path of the FCB, including within the finger or other components, explained more fully below.

Additionally, the FCB can be tied in place, such as FCB knot 242. FCB knot 242 can be tied around a structural component (not shown) within the finger or other component, and can secure the FCB in place within the finger while the various finger components move in different directions and exert various forces on the FCB. In various embodiments, the knot 242 can be tied around a linkage bar within the finger, explained more fully below. Because the FCB itself is flexible and can be physically tied into a knot, it can be secured in place in a way that allows flexible motion of the finger and the FCB without the need for bulky attachment devices or circuit routing components.

Figure 3:
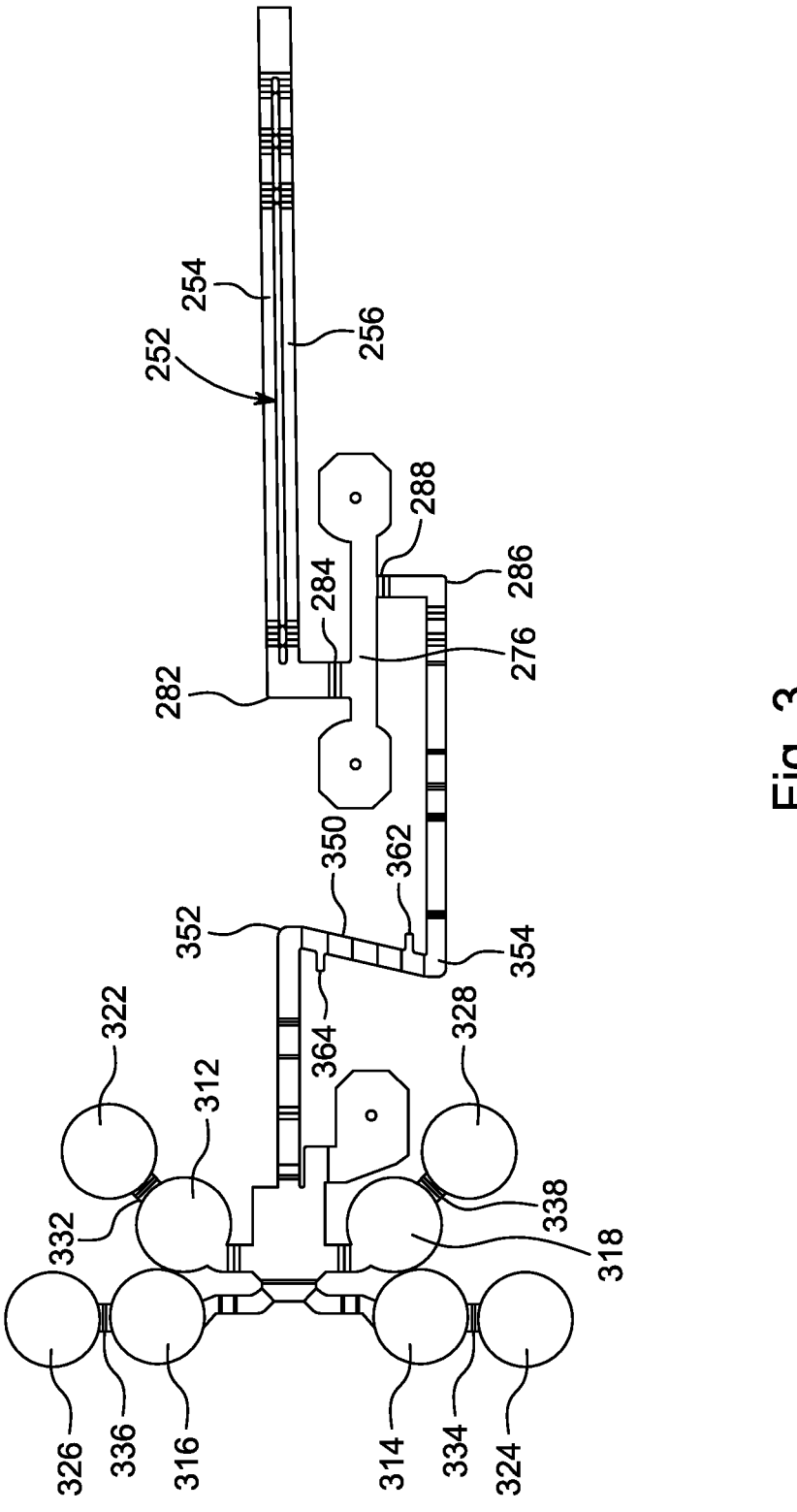
FIG. 3 is a top view of the circuitry of FIG. 2A, shown in a flat conformation before the sensors are folded and before the FCB is arranged into the shape used inside the finger of FIG. 1, according to an illustrative embodiment.

FIG. 3 is a top view of the circuitry of FIG. 2A, shown in a flat conformation before the force sensors are folded and before the FCB is arranged into the shape used inside the finger of FIG. 1, according to an illustrative embodiment. Turning now to FIGS. 1, 2A, 2B, and 3, strain on the FCB can further be reduced by having at least a portion of the FCB be split along the length, so that the FCB can more easily be flexed in different directions without bowing, binding, or kinking. Having a split 252 in an FCB 202 can be particularly valuable in places where multiple joints between the same segments allow for bending along different directions, or through three dimensions. By way of non-limiting example, the split 252 can allow a first side 254 to move and flex independent of second side 256. When proximal segment 106 moves along arrow C and along arrow D relative to base 108, the two narrower sides can move independently more freely and more flexibly compared to a single FCB having the combined width of 254 plus 256.

The FCB can be designed to fold into nearly any shape. As shown in FIG. 3, there can be one or more 90-degree turns such as 90 degree turn 282 before the FCB turns into two strands 254 and 256 that pass through the knuckles 116 and 118. Combined with a 90-degree bend at bending zone 284, the FCB path can route along the sidewall of the middle segment, then turn and route along a different direction through the knuckles 116 and 118. Similarly, 90 degree turn 286 and a 90 degree bend at bending zone 288 allow the FCB to exist in one plane in one place in the finger, and turn to route along another plane 90 degrees away. When the FCB is bending at a bending zone or flexing through a knuckle, it is flexing along a direction in and out of the page as shown in FIG. 3, or put another way, the very thin dimension is bending around a curve, while the wider dimension does not need to bend. The 90 degree turns help to allow the FCB to be folded in such away that the flat dimension bends through knuckles 112 and 114, while segment 276 the FCB can be offset 90 degrees and routed vertically though the side of the middle segment. Similarly, knot section 350 can have angles 352 and 354 that allow the FCB to be bent and tied, and then continue to route through the next knuckle with the flat dimension oriented to bend around the axis of rotation of the knuckle. Tabs 362 and 364 can help to secure the knot together when it is tied around the flex rod.

The same FCB is shown in FIG. 3 in a flat conformation after manufacturing of the FCB, and shown in FIGS. 2A and 2B in the folded conformation as it is found inside the finger of FIG. 1. Each pressure sensor, such as pressure sensor 222, is a capacitive force sensor that includes two electrodes: 312 and 322. Electrodes 312 and 322 are unitary parts of the single circuit unit 200. Distal electrode 322 can be folded over at hinge 332 so that distal electrode 322 can be nearly in contact with proximal electrode 312. Electrodes 312 and 322 can be held nearly together, while also being held just slightly apart, in the folded conformation with a compressible dielectric pad 262, such as double sided adhesive or double sided tape, to form an adjustable capacitor. The compressible dielectric pad 262 should be elastically compressible, should be an insulating dielectric material, and can have a thickness that can be between 0.2 mm and 2 mm. The compressible dielectric pad 262 can have adhesive on both sides, such as a double sided tape, and as used herein, the dielectric pad can be referred to as a compressible dielectric double sided tape, or double sided adhesive. However, although having adhesive on both sides increases the convenience of manufacturing, it should be clear that adhesive can be applied separately, and the pad does not need to be a double-sided tape. However, as used herein, in the interest of a clear description, the compressible dielectric pad may also be referred to as a dielectric double-sided tape, or compressible dielectric double-sided adhesive.

Traces in the FCB can connect the sensor to a capacitance-to-digital converter chip, also referred to herein as a touch sensor chip, such as Integrated Chip (IC) 270 so that changes in capacitance can be measured as the tape gets squished and the two electrodes on each side 312, 322 come closer together. When a compressive force is applied to the capacitive force sensor 212, the distance between electrodes 312 and 322 decreases, which changes the capacitance. By measuring the capacitance, we can measure the pressing force using an IC 270 that can be on the same circuit board connected to the electrodes. In various embodiments, the touch sensor IC 270 can be centrally located at a hub between pressure sensors. In various embodiments, the touch sensor IC can be positioned within a central cavity of a finger tip, as shown in FIG. 2B, so that it is close to the force sensors and in a location where space is at less of a premium.

Similarly, sensor 224 can be made by folding electrode 324 over electrode 314 at hinge 334 and using compressible dielectric adhesive 264. Sensors 226 and 228 can also be made by folding the electrodes around a compressible dielectric adhesive such as a double sided tape. In various embodiments, multiple capacitive force sensors, such as sensors 222, 224, 226, and 228 can be connected to the same IC 270, and the sensors can be arranged around the fingertip to measure forces from multiple sides.

This arrangement creates a compact design that can measure a quantity of force being applied from multiple different directions. It can also be assembled quickly and at little cost by folding the electrodes over the double sided tape to form sensors that are part of the unitary circuit unit 200. This requires nothing more than a piece of sticky tape and folding the circuit. The sensor can be created by folding a single flexible circuit board, which eliminates the need for multiple circuit boards sandwiched together and connected by wires. Furthermore, there is no need to create one of the electrodes by other means such as coating a surface with an electrically conductive layer that can be difficult to manufacture. Multiple sensors can be folded from the same flexible circuit board, thereby creating a 3D sensing array. The sensors are also integrated with the rest of the circuit. Because the electrodes are folded from the same flexible circuit board that contains the integrated chips, the electrical connections can be printed directly onto the circuit. This further reduces the cost of the materials, the cost of manufacturing, and the size of the unitary circuit unit 200. The unitary circuit unit can be a component within a finger while taking up very little space within the finger and thereby allowing for additional functional components within the finger, such as rotational position sensors within the joints. The folded sensor can be an elegant and compact design that is free of unnecessary parts that take up space or unnecessary assembly steps. A sensor can be made of two electrodes that are unitary with the FCB and folded over a compressible dielectric pad, free from additional components or connections.

Figures 4A, 4B, 4C:
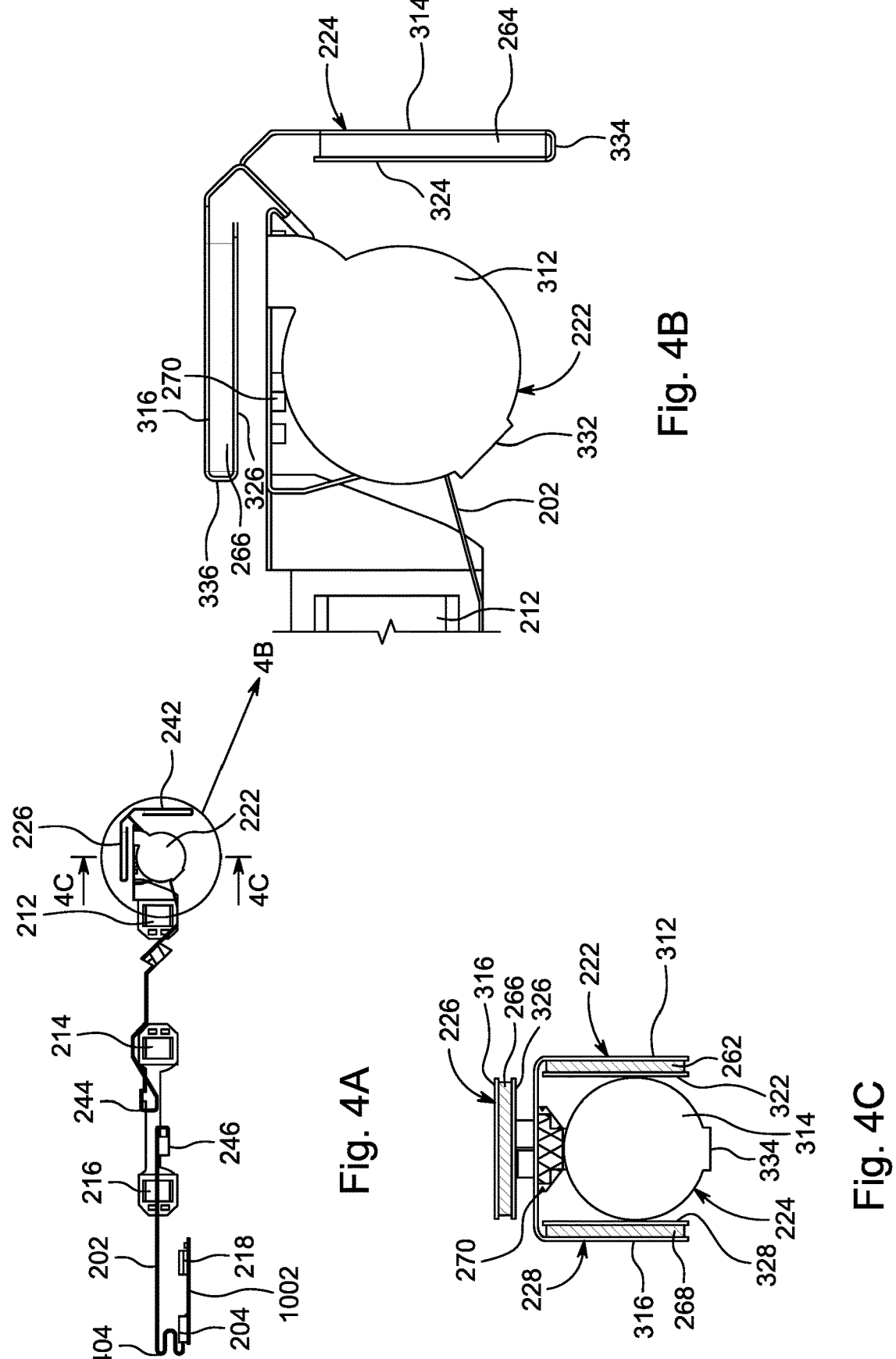
FIG. 4A is a side view of the circuitry of FIG. 2, showing pressure sensors folded into the sensing conformation, according to an illustrative embodiment.
FIG. 4B is a detailed view of the pressure sensors shown in FIG. 4A, according to an illustrative embodiment.
FIG. 4C is a cross sectional view of the sensors shown in FIG. 4A, taken along cross section line 4C-4C of FIG. 4A, according to an illustrative embodiment.

FIG. 4A is a side view of the circuitry of FIG. 2, showing pressure sensors folded into the sensing conformation and showing area of detail 4B and cross section line 4C-4C, according to an illustrative embodiment. FIG. 4A shows fingernail force sensor 226, fingertip force sensor 224, and first side force sensor 222. Rotational position encoders 212, 214, 216, and 218 are also shown. The circuit unit 200 is shown in FIG. 4A as it is found in a finger when it is fully installed within the finger. A Flexible Printed Circuit Board connector (FPC connector) 204 is used to connect the FCB 202 of the finger to the circuits of the palm, explained more fully below. The FPC connector 204 can be printed in the same process required to make the circuit board. The connectors 204 can be electrical traces as any other on the FCB, with exposed and plated pads on the end, using the same process used to make the pads of most components on the circuit board. The flex circuit can then be directly inserted into the female connector on the palm. The FCB of a finger can be connected to the FCB of the palm using the FPC connector 204, so that the fingers can be connected to the palm without additional wiring or soldering. The FPC connector can also be thinner because the flex circuit is thinner than wire connectors. The FCB can have a section of extra length 404, and the extra length section 404 can make assembly quicker and easier as it provides slack in the system between the finger and the palm. The extra length section allows slack in the system so that the connector 204 can be connected to the palm FCB 1002 easily. The extra length section 404 can also provide additional slack as the finger moves relative to the palm.

Strain relief loops 246 and 244 are shown in position as they are wrapped around a loop-holder (not shown) within the finger, and knot 242 is shown as it would be tied around a component within the finger, such as a linkage bar, (not shown) to hold the FCB in place while the finger is moving and bending. The loop holders and knot holder are described in more detail in later figures. Circuit unit 200, including FCB 202, is shown in the folded conformation as it would be threaded through the finger, including through the finger joints, with rotational encoders in the correct locations at joints, and force sensors in the correct locations within the finger, although the rest of the finger is not shown in FIG. 4A.

FIG. 4B is a detailed view of the pressure sensors shown in detail area 4B of FIG. 4A, according to an illustrative embodiment. Force sensor 226 includes electrodes 316 and 326 that are folded at hinge 336, and double sided dielectric adhesive 266 holding the electrodes near each other but slightly separated. As pressure is applied to electrode 316, the double sided dielectric adhesive 266 is slightly compressed, which results in a change in capacitance that can be measured by IC 270 and converted to a digital signal that can be transmitted through the FCB 202 to a processor that can be outside of the finger.

FIG. 4C is a cross sectional view of the sensors shown in FIG. 4A, taken along cross section line 4C-4C of FIG. 4A, according to an illustrative embodiment. The pressure sensors 222, 224, 226, and 228 can be connected through the FCB 202 to the IC 270, and IC 270 can be nestled within the finger tip cavity where space is less important and where the touch sensor IC 270 can be located close to the pressure sensors.

The sensor arrangement can be shielded with a conductive foil, such as aluminum foil, to shield the sensors from the external capacitance that can occur when bringing the sensor close to a conductive surface, such as a human finger or other conductive surface. Eliminating external capacitance allows for measuring the force acting on the sensors without having stray capacitance from electrically conductive surfaces nearby decrease the accuracy of the force measurements. The result is a very accurate sensor array that is also compact and low cost. In various embodiments, the sensors can be finalized with a protective cover made of a flexible plastic material. The protective cover for a finger can be a flexible or semi-flexible material around a conductive foil, while other force sensors in the palm of the hand can have a protective hard plastic cover, explained more fully below. In various embodiments, sensors can be covered with a hard plastic shell.

Figures 5A, 5B:
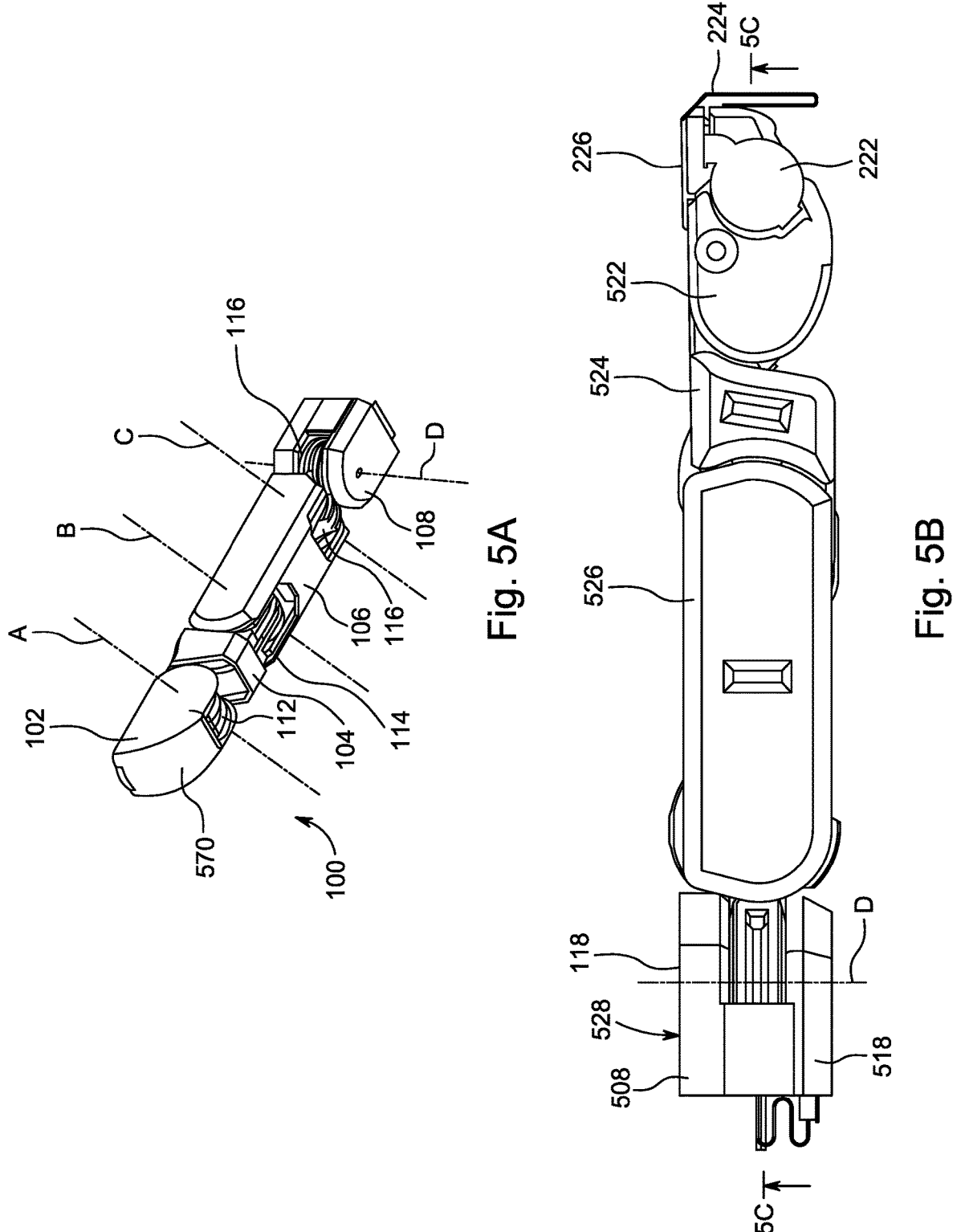
FIG. 5A is a bottom perspective view of a finger, according to an illustrative embodiment.
FIG. 5B is a side view of the finger of FIG. 5A, shown without the outer shell, according to an illustrative embodiment.
Figure 5C:
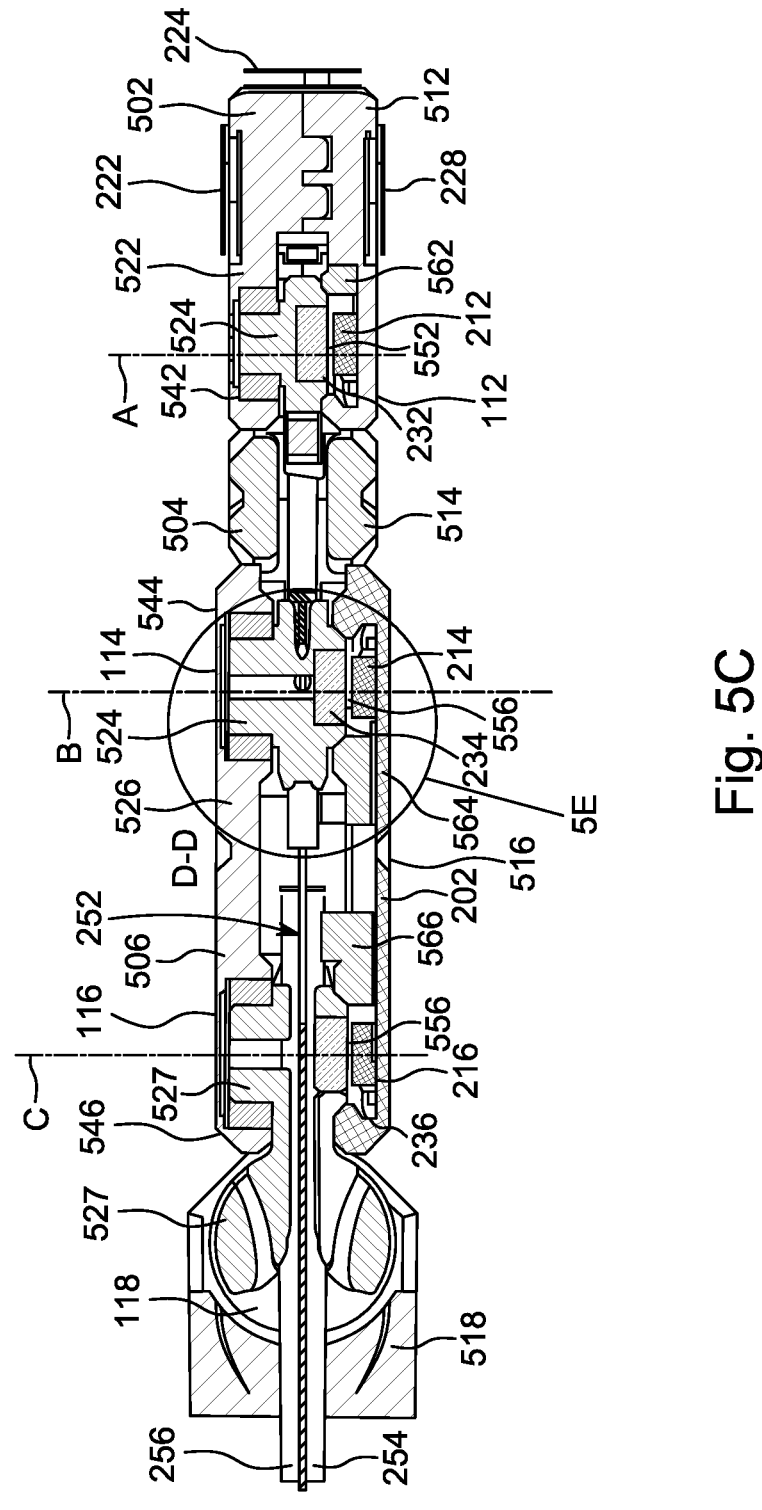
FIG. 5C is a cross section of the finger of FIG. 5B, taken along cross section line 5C-5C, and viewed from below, according to an illustrative embodiment.
Figure 5D:
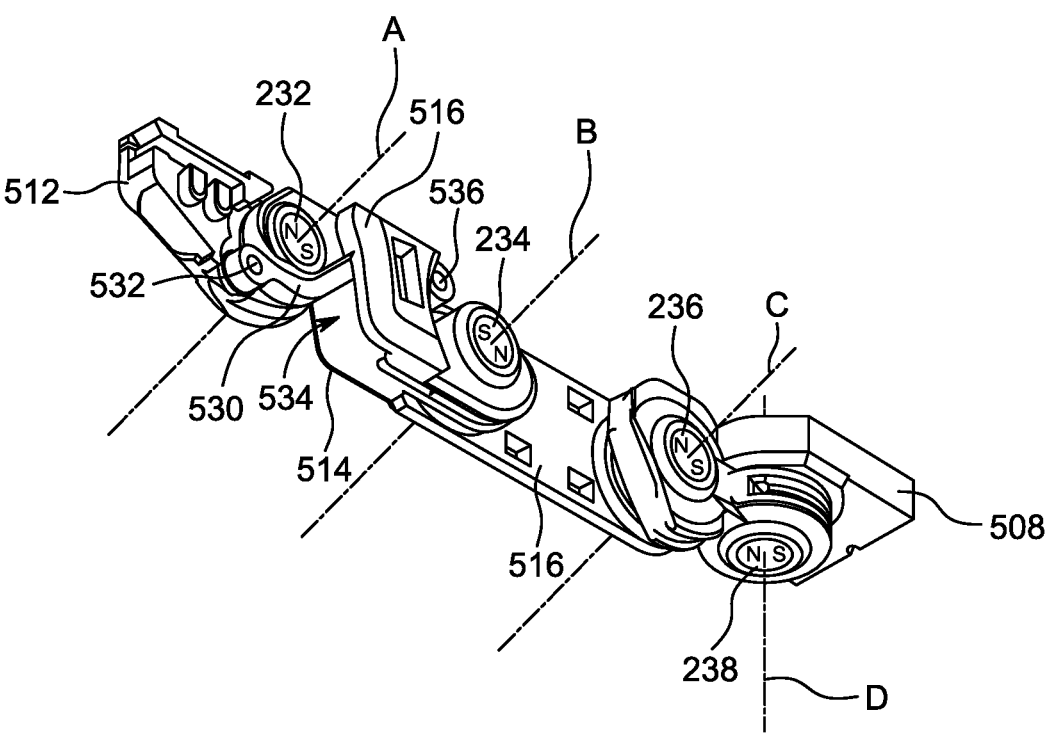
FIG. 5D is a bottom perspective view of various components inside of the finger of FIG. 5A, including structural components, and showing the placements of magnets for rotational sensors, according to an illustrative embodiment.

FIG. 5A is a bottom perspective view of a finger, according to an illustrative embodiment. and FIG. 5D is a bottom perspective view of various components inside of the finger of FIG. 5A, including structural components, and showing the placements of magnets for rotational sensors, according to an illustrative embodiment. FIG. 5A shows the finger 100 with a plastic covering over the fingertip, protecting the force sensors. Finger 100 can have a knuckle 112 between distal phalange 102 and middle phalange 104, and knuckle 112 can have an axis of rotation A. Similarly, knuckle 114 between middle phalange 104 and proximal phalange 106 can have an axis of rotation B, and knuckle 116. In various embodiments, there can be two joints between proximal phalange 106 and base 108, and curling joint 116 can have axis of rotation C. and yaw joint 118 can have axis of rotation D. In various embodiments, axis of rotation C and axis of rotation D can be 90 degrees from each other. In various embodiments, a universal joint can be used for knuckle 116 and joint 118, and axis of rotation C and axis of rotation D can be arranged in the same plane. Various arrangements of joints and axis are possible.

FIG. 5B is a side view of the finger of FIG. 5A, shown without the outer shell, according to an illustrative embodiment, and FIG. 5C is a cross section of the finger of FIG. 5B, taken along cross section line 5C-5C, and viewed from below, according to an illustrative embodiment. One or more of the phalanges can have multiple structural frame components inside a phalange. Distal phalange 102 can have a right frame 502 and a left frame 512. Terms like "left" and "right" are used herein to describe various components of a finger as a way to make the descriptions clear and easy to understand, however, it should be clear that features described as left can be on the right, and visa versa. Right frame 502 and left frame 512 can come together to form a distal bone 522. Structural components inside the finger can be referred to herein as bones, although it should be clear that the bones and joints in the finger 100 are not to be confused with the bones and joints of human anatomy, and can differ in number, shape, and arrangement from the bones of human anatomy.

The pressure sensors of the finger can be arranged around the exterior of the distal bone 522, so that the inner electrodes 312, 314, 316, 318 are held against the distal bone 522. When an object presses against the outer electrode 322, 324, 326, or 328, the force compresses the dielectric double sided adhesive material 262, 264, 266, or 268 within the sensor, resulting in a change in capacitance. The FCB can pass through the hollow inside of the distal bone 522 on the way to the middle bone 524.

Middle phalange 104 can have a right frame 504 and a left frame 514, and the right frame 504 and left frame 514 can come together to form a middle bone 524. Proximal phalange 106 can have a right frame 506 and a left frame 516, and the right frame and the left frame can come together to form a proximal bone 526. Base 108 can have an upper frame 508 and a lower frame 518, and the upper frame and the lower frame can come together to form a base bone 528. Terms like "upper" and "lower" are used herein to describe various components of a finger as a way to make the descriptions clear and easy to understand, however, it should be clear that features described as upper can be on the lower, and visa versa. An auxiliary bone 527 can be positioned between joint 116 and 118. This auxiliary bone 227 connects the joint 116 and joint 118, and together, the joint 116, auxiliary bone 527, and joint 118 allow the base 108 and proximal phalange 106 to move in multiple degrees of freedom relative to each other. Various bones can have hollow portions or hollow channels that can contain components of joints, magnets, sensors, FCB, and/or other components. A left frame and a right frame (or an upper frame and a lower frame) can be joined together to form a bone with various components held in place within the bone.

FIG. 5D is a bottom perspective view of various components inside of the finger of FIG. 5A, including structural components, and showing the placements of magnets for rotational sensors, according to an illustrative embodiment. Diametrically magnetized magnet 232, 234, 236, and 238 can be on-axis for each joint. The central axis of the disc-shaped magnet can be the same axis as the pivoting axis for the joint. As shown on magnet 238, this means that the N and S poles of the magnet can be on the flat surface of the magnet, with the N on one side and the S on the other side of the axis D. The specific rotation of the N and S around the axis can vary from that shown in FIG. 5D, however, the N and S can both be on the face and on opposite sides of the axis so that a diameter line connecting the N and the S passes through the central axis D. Each of the joints 112, 114, 116, and 118 can have a diametrically magnetized magnet arranged on-axis in the same way.

A finger 100 can have a linkage bar 530 that can link between bones. Linkage bar 510 can be anchored to the distal bone 502 at pivot 532, and linkage bar 510 can be anchored to proximal bone 506 at pivot 536. Distal bone 522, linkage bar 530, middle bone 524, and proximal bone 526 together can form a four-bar linkage, explained more fully below. Middle bone 524 can have a bar cavity 534 that can accommodate the linkage bar in different positions and orientations as the finger bends and straightens.

Figure 5E:
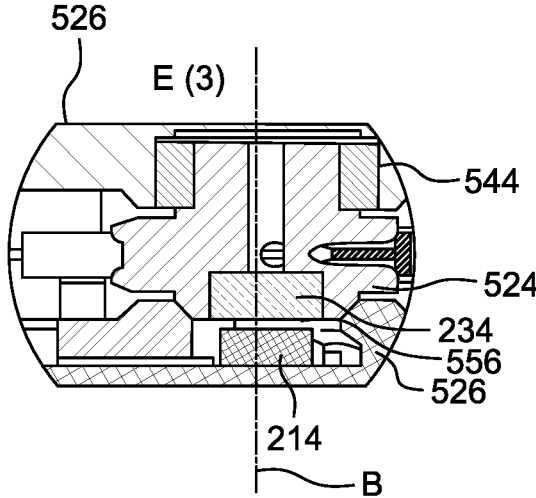
FIG. 5E is a detailed view of the area of detail 5E in FIG. 5C, showing an arrangement of joint components within the bone, according to an illustrative embodiment.

FIG. 5E is a detailed view of the area of detail 5E in FIG. 5C, showing an arrangement of joint components within the bone, according to an illustrative embodiment. Turning now to FIGS. 5A, 5B, 5C, 5D, and 5E, the arrangement of a magnet, a rotational encoder, and the rotational axis of a joint are described. Joint 114 can have bearings 544 that facilitate the movement between middle bone 524 and proximal bone 526, and magnet 234 can be on-axis with the bearing and joint. Magnet 234 can secured to the middle bone 524, and the rotational position encoder 214 can be next to the magnet 234, but secured to the proximal bone 526. When the middle phalange 104 pivots relative to proximal phalange 106 around joint 114, the magnet 234 secured to the middle bone 524 pivots relative to the rotational encoder 214 secured to the proximal bone 526. As the magnet rotates relative to the rotational encoder, the N and S poles of the magnet rotate relative to the encoder, the encoder can sense the rotation of the magnet as the N and S poles travel around the axis. An air gap 556 can separate the magnet and sensor chip of the rotational encoder allowing them to rotate freely relative to each other without contacting each other. In various embodiments, the air gap 556 can be approximately 0.5 mm.

As shown in FIGS. 5C and 5E, the rotational encoder chip 214 is mounted to the right proximal frame 516, and the magnet is mounted to the right middle frame 514, however, it should be clear that in various embodiments, the rotational encoder chip could be mounted to the left proximal frame 526 with the magnet on the left middle frame 524, and in various embodiments, the magnet could be on a proximal frame with the encoder on a middle frame. The arrangement of the magnet on one phalange with the encoder on the other phalange allows the encoder to detect the rotational position of the magnet, and thereby detect the rotational position of one phalange relative to the other. The specific arrangement between phalanges and between sides could be varied while still sensing the rotational position of one phalange relative to the other.

Each joint can have a similar arrangement of bearings, magnet, encoder, and air gap. Joint 112 can have bearings 542 that can be press fit into the frame allowing for free rotation between distal bone 522 and middle bone 524. Magnet 232 can be on axis along axis A with encoder 212 positioned near magnet 232 with an air gap 552 between the encoder and magnet that can be approximately 0.5 mm. As the distal bone and the middle bone move relative to each other around joint 212, the magnet rotates relative to the rotational encoder, and the rotational encoder can sense the changing position of the N and S poles. The sensed data of the magnet rotating relative to the encoder can then be used to determine the rotational position of the joint, and thereby the rotational position of the distal phalange relative to the middle phalange.

Similarly, joint 116 can have bearings 546, a magnet 236 that can be on-axis along axis C, and a rotational encoder 216 that can be positioned near the magnet 236 with an air gap 556 between the magnet and sensor that can be approximately 0.5 mm. Joint 118 can have bearings that can be on axis along axis D, and a rotational encoder 218 that can be positioned near the magnet 238 with an air gap between the magnet and encoder that can be approximately 0.5 mm. The sensed data of the magnet rotating relative to the encoder can then be used to determine the rotational position of the joint. The stack including the reference magnet, the air gap, the rotational encoder, and the FCB can be 9 mm or less, resulting in a highly accurate sensor for measuring the position of the joint while also taking up very little space inside the knuckle and allowing for other components such as tendons to pass through the knuckle without interference.

In various embodiments, the rotational position sensors can be rotational potentiometers instead of contactless potentiometers. A rotational potentiometer can be free of magnets, and can include a shaft instead of a diametrically magnetized magnet. The rotational potentiometer can be an IC on the FCB, similar to the rotational encoders shown in FIG. 5D. The shaft can be press-fit into one side of a joint, such as a middle bone, and the rotational potentiometer can be mounted the other joint component, such as a proximal bone. The two parts of the joint that rotate relative to each other could then be connected by the shaft of the rotational potentiometer. However, this design that replaces the contactless potentiometer with a rotational potentiometer is superior to the potentiometer, at least because the potentiometer uses internal conductive brushes in an arrangement with friction that results in wear over time and eventual breakdown with repeated usage, while the magnet-based design has no friction and no wear, and because the potentiometer is susceptible to water while the IC of the contactless pentiometer can be sealed for a water resistant design. Accordingly, this novel design has implemented the use of a Hall effect magnet rotational position sensor that results in superior performance, superior lifespan, superior reliability, superior accuracy, and a superior compact design.

The innovative design described herein allows for a significant reduction in the space requirements of various components. By having a single FCB 202 that carries all signals through the finger in a compact arrangement, additional space is available to have rotational position sensors actually located on axis within each joint. And the compact design of the rotational position sensors allows enough space for the FCB to pass through the interiors of joints. Allowing the FCB to pass through the interior of a joint means the FCB is flexed less and requires less available slack along the FCB. Inferior prior art designs have been forced to route wires along the outside of a joint in a way that requires significant extra slack and results in significant wear on the wires.

In an embodiment, space requirements can be further minimized by having the rotational encoders 214 and 216 mounted along the inside of the proximal frame, with the FCB 202 routed along the edge and folded into the middle of the proximal bone. The FCB can be folded into the shape shown in FIGS. 2A and 2B, with the encoders along the edge of the interior of the finger. The FCB can have a proximal segment 276, as shown in FIG. 2A, that can be pressed along the side of the proximal frame, and the FCB can be folded through three dimensions in space so that the FCB can pass through the middle of each joint and flex as the joints move. The FCB 202 can be tied in a knot 242 around the linkage bar 530 so that the FCB remains in position arranged down the centers of joints 112 and 114. The split 252 in the FCB allows the FCB to flex more easily as it passes down the centers of joints 116 and 118, and as the joints 116 and 118 rotate along different axis and the phalanges move in multiple different directions relative to each other.

Figure 6A:
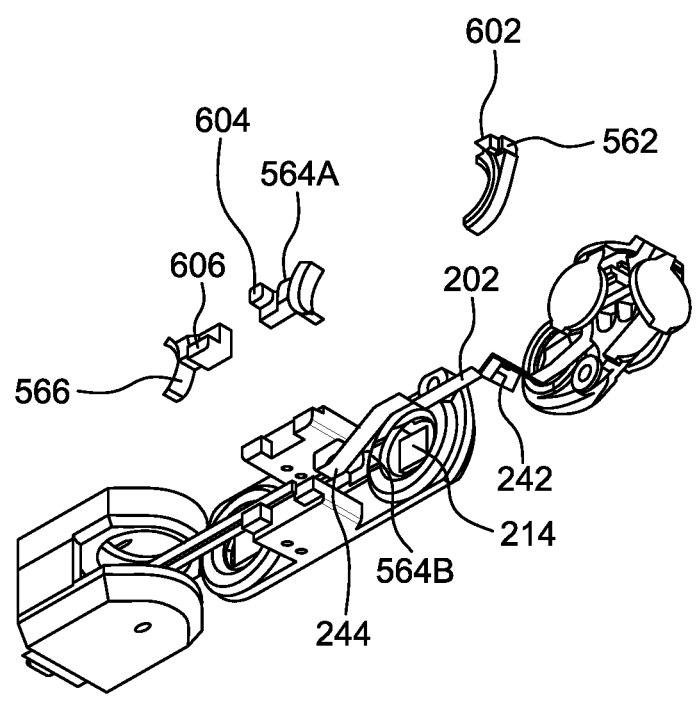
FIG. 6A is an exploded bottom perspective view of various components inside the finger of FIG. 5A, including multipurpose clips that can maintain the positions of rotational sensors and the FCB; according to an illustrative embodiment.
Figure 6B:
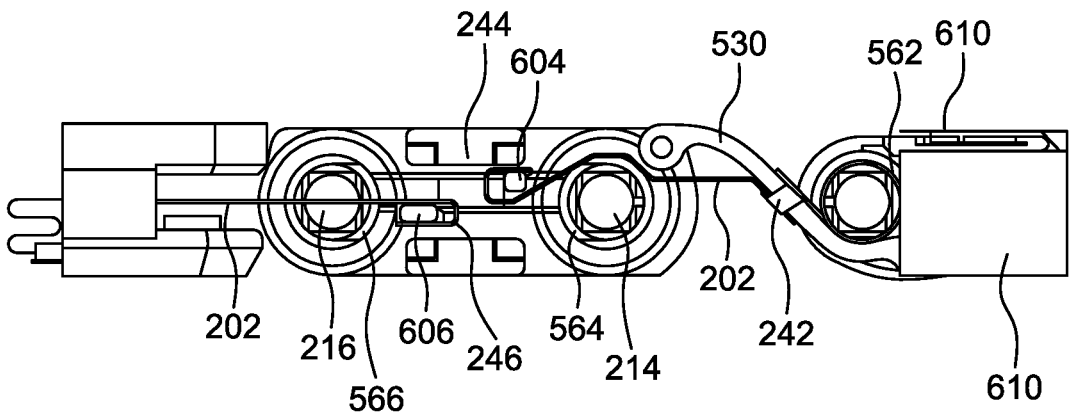
FIG. 6B is a side view of various components inside the finger of FIG. 5A, showing rotational sensors held in place by the clips and showing the arrangement of the FCB and magnets; according to an illustrative embodiment.

A multifunctional clip 564 can hold encoder 214 in place on the proximal bone 526, while also providing a loopholder to hold strain relief loop 244. FIG. 6A is an exploded bottom perspective view of various components inside the finger of FIG. 5A, including multipurpose clips that can maintain the positions of rotational encoders and the FCB; according to an illustrative embodiment, and FIG. 6B is a side view of various components inside the finger of FIG. 5A, showing rotational encoders held in place by the clips and showing the arrangement of the FCB and magnets; according to an illustrative embodiment. In FIG. 6A, the multifunctional clip 564 is shown isolated in position 564A before assembly, and is shown in assembled position 564B where it can hold the rotational position encoder 214 in place. Turning to FIGS. 5C, 5E, 6A, and 6B, the multifunctional clip 564 can hold encoder 214 and multifunctional clip 566 can hold encoder 216 in place on the proximal frame. Together, clips 564 and 566 secure the proximal segment 276 in place along the proximal frame. The clips hold the FCB in place while also securing the encoder precisely on the axis of rotation. The clips also contribute to keeping the sensor and the magnet slightly separated by an air gap, which allows for improved operation of the rotational position sensor.

Strain relief loop 244 is wrapped around loop holder 604 of clip 654, and strain relief loop 246 is wrapped around loop holder 606 of clip 566. Loop holders 604 and 606 can work together to support the FCB 202 in place down the middle of the finger. Strain relief loops 244 and 246 can also be seen in FIG. 4A. Having the FCB wrapped around the loop holders with strain relief loops not only keeps the FCB in place, but the strain relief loops can provide slack when necessary and hold excess slack out of the way when necessary as the finger bends and straightens. Similarly, clip 562 helps to secure a rotational encoder precisely on axis for joint 112, and the FCB holder 602 of clip 562 helps to route the FCB 202 in place down the middle of the finger.

Rotational position encoders 212 and 214 can work together to sense force on the surface 570 of distal phalange 102, as indicated in FIG. 5A. Capacitive force sensors can sense contact force on pressure sensitive areas 122, 124, 126, and 128, however, the bottom surface of the finger, shown as 570 in FIG. 5A, may not need a capacitive force sensor. A four-bar linkage system within the finger can work with the rotational position encoders 212 and 214 to sense force on surface 570. Capacitive force sensors can be shielded by a thin layer of aluminum foil. As shown in FIG. 6B, the foil 610 can shield each of the sensors. The protective outer cover of the fingertip can then be applied over and around the foil.

FIG. 7A is a schematic diagram of a 4-bar linkage system that can use magnetic rotational sensors to determine torque and pressure, shown with the finger in a straight conformation, according to an illustrative embodiment. In this schematic diagram, distal segment 702 is joined to middle segment 704 at joint 712, and middle segment 704 is joined to proximal segment 706 and joint 714. Distal segment 702 also has a pivot 722 that is connected to linkage bar 720, and linkage bar 720 is connected to proximal segment 706 at pivot 726. Distal segment 702, middle segment 704, and proximal segment 706 can be rigid. Linkage bar 720 can be made from a semi-rigid material, so that linkage bar 720 will flex under force. Joint 714 can be an active joint driven by a motor such as a servo located within the palm or arm of a robot that can be connected to the joint with tendons, explained more fully below. When the motor forces the joint 714 to rotate, or put another way, when the motor forces the middle segment 704 to move around the joint 714 relative to the proximal segment 706, the linkage bar between pivot 726 and pivot 722 will pull the distal segment 702 to move around the joint 712 relative to the middle segment.

FIG. 7B is a schematic diagram of the 4-bar linkage system of FIG. 7A, shown with the finger in a bent conformation and without applied pressure, according to an illustrative embodiment. After the motor has forced the joint 714 to rotate, or put another way, after the motor has forced the middle segment 704 to move around the joint 714 relative to the proximal segment 706, the linkage bar 726 between pivot 726 and pivot 722 has now pulled the distal segment to move around joint 712 relative to the middle segment. The four-bar linkage system causes both joints to rotate, or causes all three segments to move around the joints, while only one of the joints is directly powered. This four-bar linkage system allows the finger to curl around multiple joints without the need to provide a motor to power movement at each joint. The angle of the passive joint 712 can be computed from the angle of the driven joint 714 and the lengths of the segments.

FIG. 7C is a schematic diagram of the 4-bar linkage system of FIG. 7B, shown with pressure applied to an outer, fingernail side of a finger, thereby flexing the linkage bar in a shortened conformation; according to an illustrative embodiment. When force is applied to the top, fingernail portion of the distal segment 702, such as in the direction of arrow T, the semi-rigid linkage bar 720 can compress or otherwise flex to allow the distal segment 702 to rotate around the passive joint 712 under the pressure in the direction of arrow U. The system can then calculate the torque applied to the fingernail area by measuring the rotational angle of joint 712 and the rotational angle of joint 714 and comparing them to the no-load condition shown in FIG. 7B.

FIG. 7D is a schematic diagram of the 4-bar linkage system of FIG. 7B, shown with pressure applied to an inner side of a finger, thereby flexing the flex bar in an elongated conformation; according to an illustrative embodiment. When force is applied to the bottom of the finger, such as in the direction of arrow V, the semi-rigid linkage bar 720 can stretch or otherwise flex to allow the distal segment 702 to rotate around the passive joint 712 under the pressure in the direction of arrow W. The system can then calculate the torque applied to the bottom of the finger by measuring the rotational angle of joint 712 and the rotational angle of joint 714 and comparing them to the no-load condition shown in FIG. 7B.

Figures 8A, 8B, 8C, 8D:
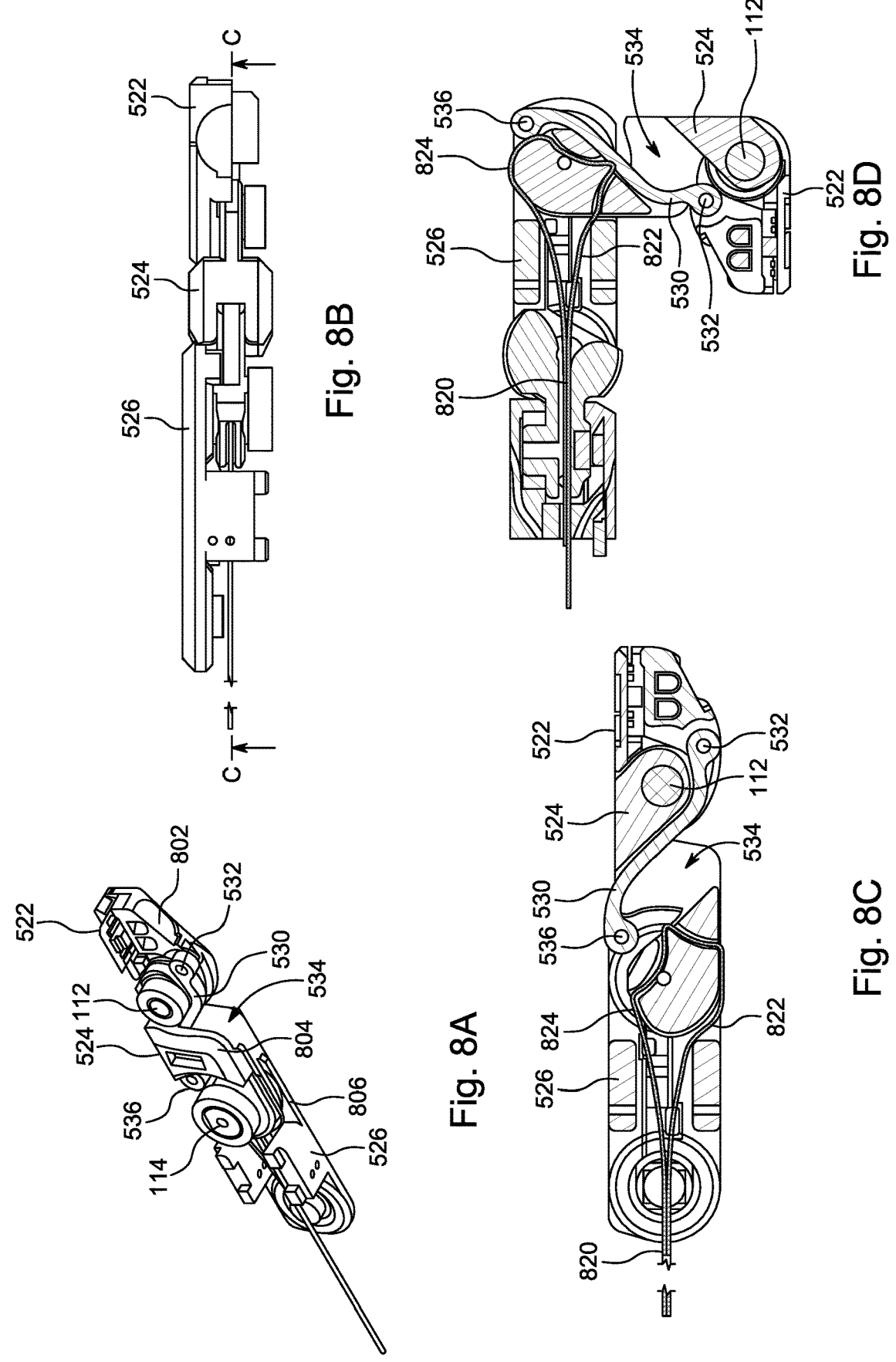
FIG. 8A is a perspective view of the interior of the robotic finger of FIG. 8A showing the components of the 4-bar linkage system, according to an illustrative embodiment.
FIG. 8B is a top view of the partial robotic finger shown in FIG. 8A, according to an illustrative embodiment.
FIG. 8C is a cross section view of the partial robotic finger of FIG. 8B, taken along cross section line 8C-8C, showing the finger in a straight conformation, according to an illustrative embodiment.
FIG. 8D is a cross section view of the partial robotic finger of FIG. 8B, taken along cross section line 8C-8C showing the finger in a bent conformation, according to an illustrative embodiment.

FIG. 8A is a perspective view of the interior of the robotic finger of FIG. 8A showing the components of the 4-bar linkage system, according to an illustrative embodiment, FIG. 8B is a top view of the partial robotic finger shown in FIG. 8A, according to an illustrative embodiment, and FIG. 8C is a cross section view of the partial robotic finger of FIG. 8B, taken along cross section line 8C-8C, according to an illustrative embodiment. Distal bone 522 can be distal segment 802 of the four-bar linkage system, middle bone 524 can be middle segment 804 of the four bar linkage system, and proximal bone 526 can be proximal segment 806 of the four bar linkage system. Distal segment 802 is connected to middle segment 804 at joint 112, and proximal segment 806 is connected to middle segment 804 at joint 114. Linkage bar 530 can link between proximal segment 806 and distal segment 802. Linkage bar 530 can be anchored to proximal segment 806 at pivot 536, and anchored to distal segment 802 at pivot 532. Middle bone 524 can have a bar cavity 534 that can accommodate the semi-rigid linkage bar 530 in different positions and orientations as the finger bends and straightens.

This arrangement creates a four-bar linkage system with a known relationship between the two rotational joints 112 and 114. In various embodiments, the linkage bar 530 can have an S-curve, or other shape, along the length of the bar that allows it to flex in either direction as force is applied to the top or bottom of the finger. By measuring the rotational position of joint 112 and joint 114, the system can calculate force being applied to the distal segment that causes the linkage bar 530 to flex one way or the other.

FIG. 8D is a cross section view of the partial robotic finger of FIG. 8B, taken along cross section line 8C-8C showing the finger in a bent conformation, according to an illustrative embodiment. Turning to FIGS. 8C and 8D, flexor tendon 822 can pull on the middle segment 804 to cause the middle segment 804 to rotate around the joint 114 into a bent conformation, as shown in FIG. 8D. Extensor tendon 824 can pull on the middle segment 804 to cause the middle segment 804 to rotate around the joint 114 into a straight conformation, as shown in FIG. 8C. When the flexor tendon 822 powers segments 804 and 806 into a bent conformation around joint 114, the linkage bar 530 pulls segment 802 into a bent conformation around joint 112, as shown in FIG. 8D.

When the extensor tendon 824 powers the segments 804 and 806 into a straight conformation around joint 114, the linkage bar 530 pulls segment 802 into a straight conformation around joint 112, as shown in FIG. 8C. The two tendons 822 and 824 can pass through the center of joint 116 as a tendon bundle 820. However, it should be clear that the tendons are not required to be bundled together as a tendon bundle 820 to pass through the finger, the palm, or the wrist. Because of the various innovative and space saving designs described herein, more space is available inside the fingers, palm, and wrist than is required for the various components.

FIG. 9 is a perspective view of an assembled robotic hand, including a wrist, palm, and fingers, according to an illustrative embodiment. Robotic hand 900 can have a plurality of fingers 100 that can be attached to a palm 910. Tendons and FCBs from each finger can pass through the palm and through the wrist 920 to connect to various circuits, processors, servos, etc. of a robot. In various embodiments, a robotic hand can have five fingers, more than five fingers, or less than five fingers. As used herein, the word "palm" refers to the portion of a hand that does not include fingers. The word "palm" is not intended to refer to a particular side of the hand.

Figure 10:
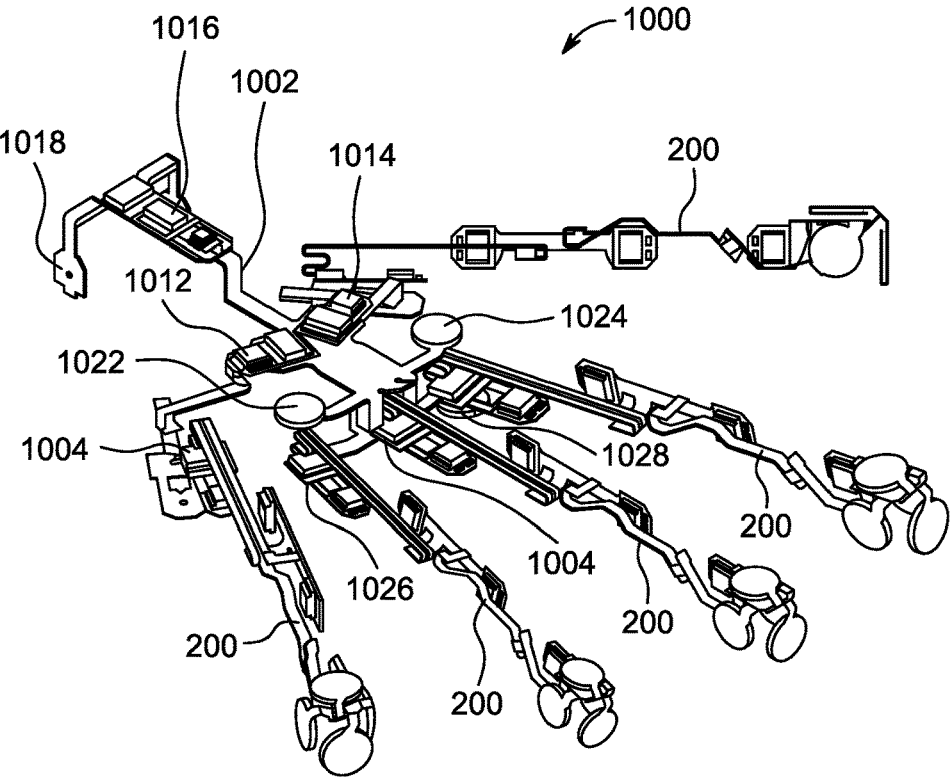
FIG. 10 is a perspective view of the circuitry, including sensors, from inside the robotic hand with fingers, according to an illustrative embodiment.

FIG. 10 is a perspective view of the circuitry, including sensors, from inside the robotic hand with fingers, according to an illustrative embodiment. Palm circuitry 1000 can include a palm FCB 1002, palm force sensors 1022, 1024, 1026, and 1028, finger rotational position encoders 1012 and 1014, and wrist rotational position encoders 1016 and 1018. Palm circuitry 1000 can include one or more FPC connectors 1004 that allow finger circuitry units 200 to be connected to the palm circuitry unit 1000.

Each finger circuit unit 200 can be plugged into an FPC 1004 on the palm. The FCB of the palm can have traces that correspond to the traces of the finger FCBs 202. All of the electrical signals originating from within a finger, such as sensed data from force sensors and/or rotational position sensors of a finger, can be transmitted through the FCB of the finger, and then transmitted to the FCB of the palm. The signals from more than one finger can then be transmitted through the FCB of the palm back to the arm. In this way, there is no need for bulky wires or a large number of wiring connections within the palm. Each finger can be connected to the palm FPC 1004, and then all sensed information can be transmitted to the arm through the palm FCB, thereby substantially reducing the space requirements within the palm.

Figures 11A, 11B:
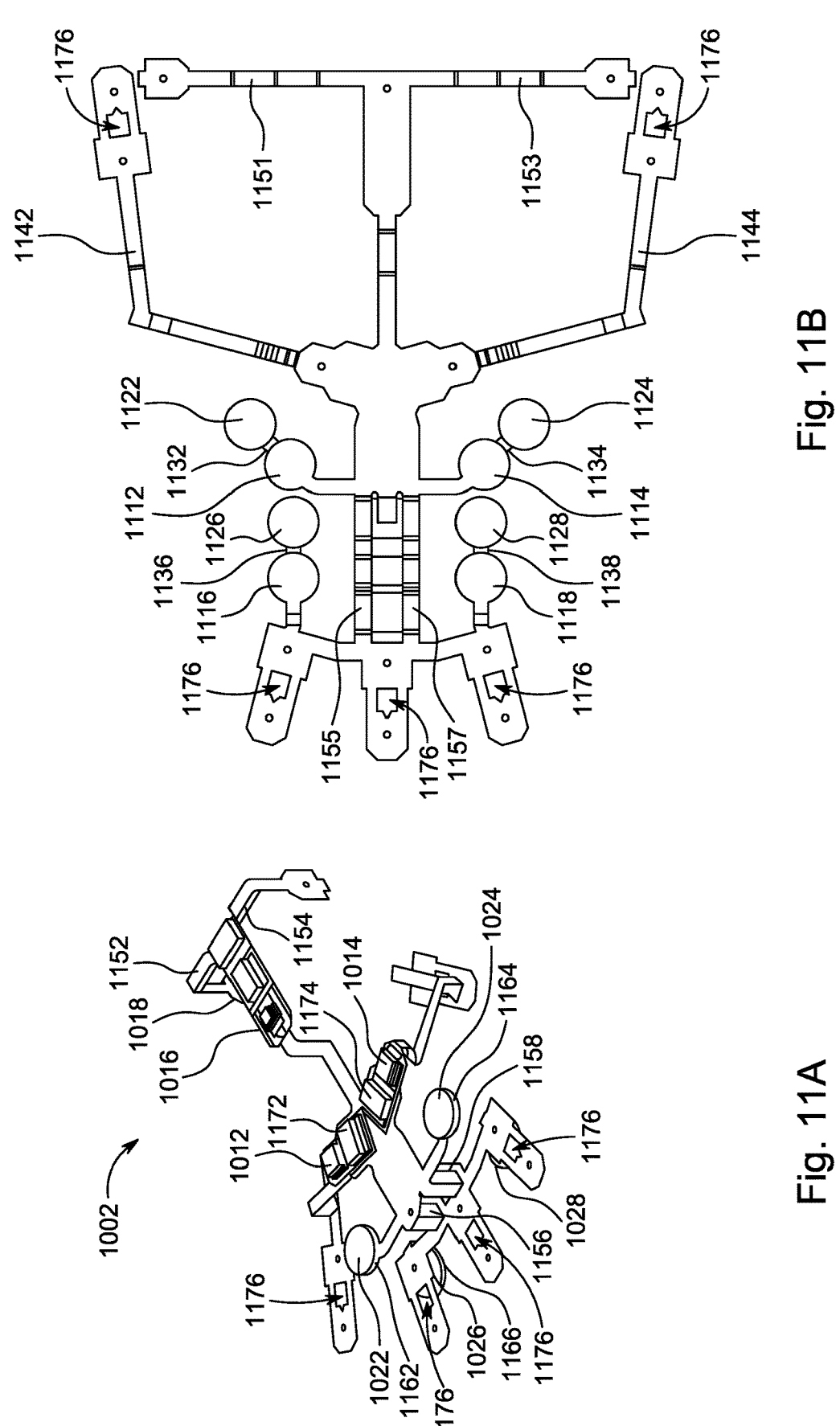
FIG. 11A is a perspective view of the circuitry, including sensors, from inside of a robotic palm shown without fingers, according to an illustrative embodiment.
FIG. 11B is a top view of the circuitry of FIG. 11B, shown in a flat conformation before the sensors are folded and before the FCB is arranged into the shaped used inside the palm of FIG. 9, according to an illustrative embodiment.

FIG. 11A is a perspective view of the palm circuitry, including sensors, from inside of a robotic palm shown without fingers, according to an illustrative embodiment, and FIG. 11B is a top view of the circuitry of FIG. 11A, shown in a flat conformation before the sensors are folded and before the FCB is arranged into the shaped used inside the palm of FIG. 9, according to an illustrative embodiment. Palm circuitry 1002 can be manufactured flat as a single sheet to reduce costs, and then it can be folded into the appropriate conformation.

Palm circuitry 1002 can include two force sensors 1022 and 1024 that are arranged on the top of the palm portion to sense contact force on the back of the hand, and two force sensors 1026 and 1028 that are arranged on the bottom of the palm portion to sense contact force on the bottom, or inside of the hand. These palm force sensors can be constructed in the same way as the force sensors in the fingers. As shown in FIGS. 11A and 11B, capacitive force sensor 1022 can include electrode 1112 and electrode 1122. Electrode 1112 and electrode 1122 can be folded at hinge 1132, and the two electrodes can be brought together and stuck together using a dielectric double sided adhesive 1162. The descriptions of the manufacturing and functionality of the capacitive force sensors of the fingers, described above, also describes the manufacturing and functionality of these capacitive force sensors in the palm. Sensors 1022, 1024, 1026, and 1028 can be manufactured flat and folded together with dielectric double-sided adhesive separating the two electrodes. Sensor 1024 includes electrodes 1114 and 1124 separated by hinge section 1134, and dielectric double sided adhesive 1164. Sensor 1026 includes electrodes 1116 and 1126 separated by hinge section 1136, and dielectric double sided adhesive 1166. Sensor 1028 includes electrodes 1118 and 1128 separated by hinge section 1138, and dielectric double-sided adhesive.

Rotational position encoders 1016 and 1018 can work with diametrically magnetized magnets to sense the rotational position of the wrist in two directions including an up-down direction and a side-to-side, or yaw, direction. The outer fingers, which can be referred to as a pinkie and a thumb, can have an additional joint, described more fully below, that allows the base of the finger to pivot relative to the rest of the palm. Rotational position encoder 1012 can work with a diametrically magnetized magnet to sense the rotational position of the base joint for the pinkie. Rotational position encoder 1014 can work with a diametrically magnetized magnet to sense the rotational position of the base joint for the thumb. The descriptions of the manufacturing and functionality of the rotational position sensors of the finger joints, described above, also describes the manufacturing and functionality of these rotational position sensors in the palm.

In various embodiments, the palm FCB 1002 and/or finger FCB can include ancillary circuitry such as ancillary circuitry 1172 and 1174. In various embodiments, ancillary circuitry 1172 and or 1174 can be multiplexing ICs that can help to connect the multiple sensors to a single data line. This can reduce the number of traces required on the FCB, and can therefore reduce the size of the FCB as it passes through various space-limited components such as the wrist. In various embodiments, there can be a processor and an Inertial Measurement Unit (IMU). Space savings from various features herein, including integrated sensors, allow for placement of additional components such as processor units, multiplexing ICs, inertial measurement units, temperature sensors, etc. on the FCB and within the hand. Ancillary circuitry 1172 and/or 1174 can be various multiplexing ICs, processors, IMUs, and/or various other ancillary circuitry.

As shown in FIG. 11B, pinkie circuit 1142 and thumb circuit 1144 of the palm FCB 1002 can be manufactured in the same way as each other, with the circuits manufactured as components of a symmetric FCB 1002. The FCB pinkie circuit 1142 and thumb circuit 1144 can be folded into different conformations, so that the thumb circuit can be positioned further back along the side of the palm. This allows for an opposable thumb to be positioned back from the other fingers while also allowing the circuitry to be easily manufactured symmetrically. This symmetrical manufacturing eliminates the need for separate FCBs to be produced for left hands vs right hands, which further reduces manufacturing costs.

The FCB 1002 can be folded in a way that includes strain relief loops 1152 and 1154 that can allow the FCB to flex and move as the hand moves relative to the wrist. Folding sections 1151 and 1153 can be folded to create strain relief loops 1152 and 1154, respectively. The FCB can also be folded in a way that includes folded sections 1056 and 1058 at the bottom, near the fingers. These folded loops 1056 and 1058 can allow the FCB to elongate during assembly, including during attachment of the fingers, and then allow the FCB to be tucked into a compact design after assembly. Folding sections 1155 and 1157 can be folded to create folded loops 1156 and 1158, respectively.

The FCB 1002 can be manufactured with a tendon hole 1176 for the tendons of each hand. The tendons, which can be arranged as a tendon bundle, can pass through the tendon hole 1176 and can connect with servo motors in the arm. By having a hole for the tendons to pass through the FCB, the FCB and the tendons can occupy the same areas of the hand without interfering with each other.

Figure 12A:
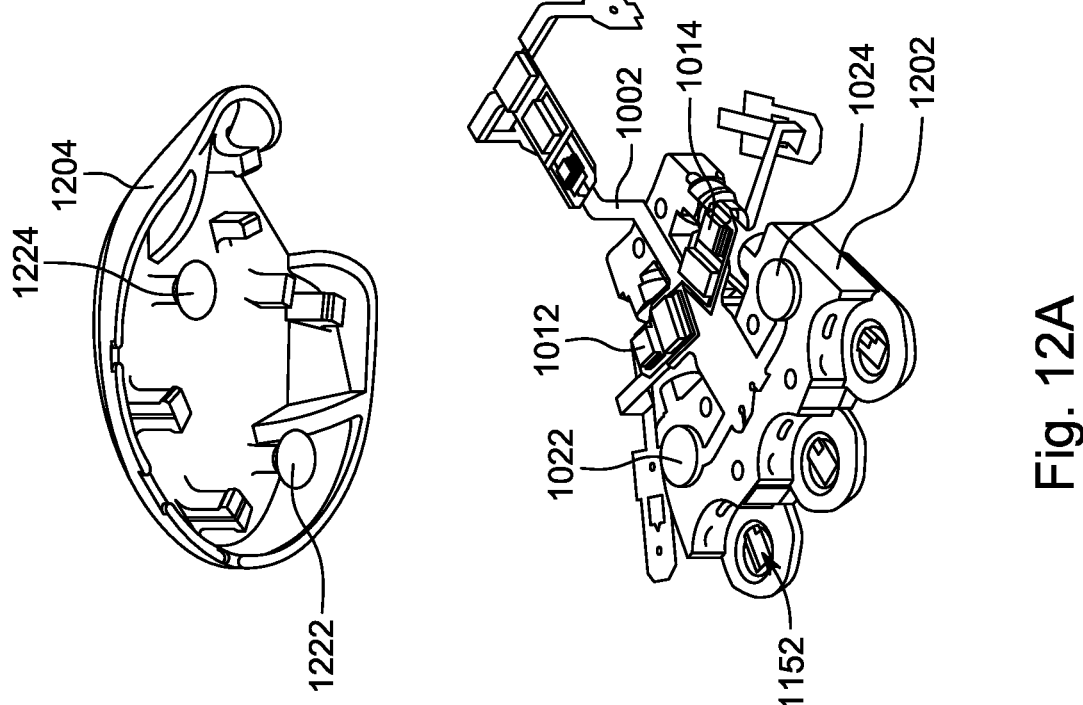
FIG. 12A is an exploded perspective view of the top of a partially assembled palm, showing circuits, sensors, and removed back cover, according to an illustrative embodiment.

FIG. 12A is an exploded perspective view of the top of a partially assembled palm, showing circuits, sensors, and removed back cover, according to an illustrative embodiment. The circuitry unit 1002 of the palm can be joined with a rigid plastic palm bone 1202. In various embodiments, the palm bone can include multiple frame components that can be assembled with the circuitry unit 1002, and/or the circuitry unit 1002 can be folded into the folded conformation of FIG. 11A with the palm bone. Capacitive force sensors can be arranged on the exterior of the palm bone. In various embodiments, the sensors can be finalized with a protective cover made of a flexible plastic material. In various embodiments, sensors can be covered with a hard plastic shell that can be suspended on pegs above the sensors. These pegs can increase the distance to the external contact surface, thereby minimizing external capacitance and minimizing interference with the measurement of force that is measured by measuring the capacitance between the two electrodes.

A rigid or semi-rigid top cover 1204 can snap into engagement with the palm bone 1202. The top cover 1204 can have pegs 1222 and 1224 that can align with the sensors on the top of the hand 1022 and 1024. In a fully assembled position, the pegs 1222 and 1224 can rest against the top sensors 1022 and 1024. The top sensors can thereby be sandwiched between the pegs of the top cover and the palm bone. When an object is pressed against the top cover 1204, the forces are transmitted through the pegs to the sensors on the top of the hand, and the sensors 1022 and 1024 are thereby squeezed between the pegs and the palm bone. As the capacitive force sensors 1022 and 1024 are squeezed, the capacitance between the two electrodes changes, and the quantity of force can be determined from the change in capacitance.

FIG. 12B is an exploded perspective view of a partially assembled palm, showing circuits, sensors, and removed hand bottom cover, according to an illustrative embodiment. Similar to the top of the palm shown in FIG. 12A, the bottom of the palm has force sensors 1026 and 1028 that can be on the surface of the palm bone 1202. A rigid or semi rigid bottom cover 1206 can snap into engagement with the palm bone 1202. The bottom cover can have sensor engagement points 1226 and 1228 that can align with the sensors 1026 and 1028 on the bottom of the hand. The bottom sensors can thereby be sandwiched between the palm bone and the bottom cover 1206. When an object is pressed against the bottom cover 1206, the forces are transmitted through the bottom cover to the sensors on the bottom of the hand, and the sensors 1026 and 1028 are thereby squeezed between the bottom cover and the palm bone. As the capacitive force sensors 1026 and 1028 are squeezed, the capacitance between the two electrodes changes, and the quantity of force can be determined from the change in capacitance. The capacitive force sensors in the palm operate under the same principles as the capacitive force sensors in the fingers, and similarly, they occupy very little space, are manufactured as a single component with the FCB, are very cheap to manufacture, and do not require additional wires or connections inside the hand.

Figures 13A, 13B, 13C:
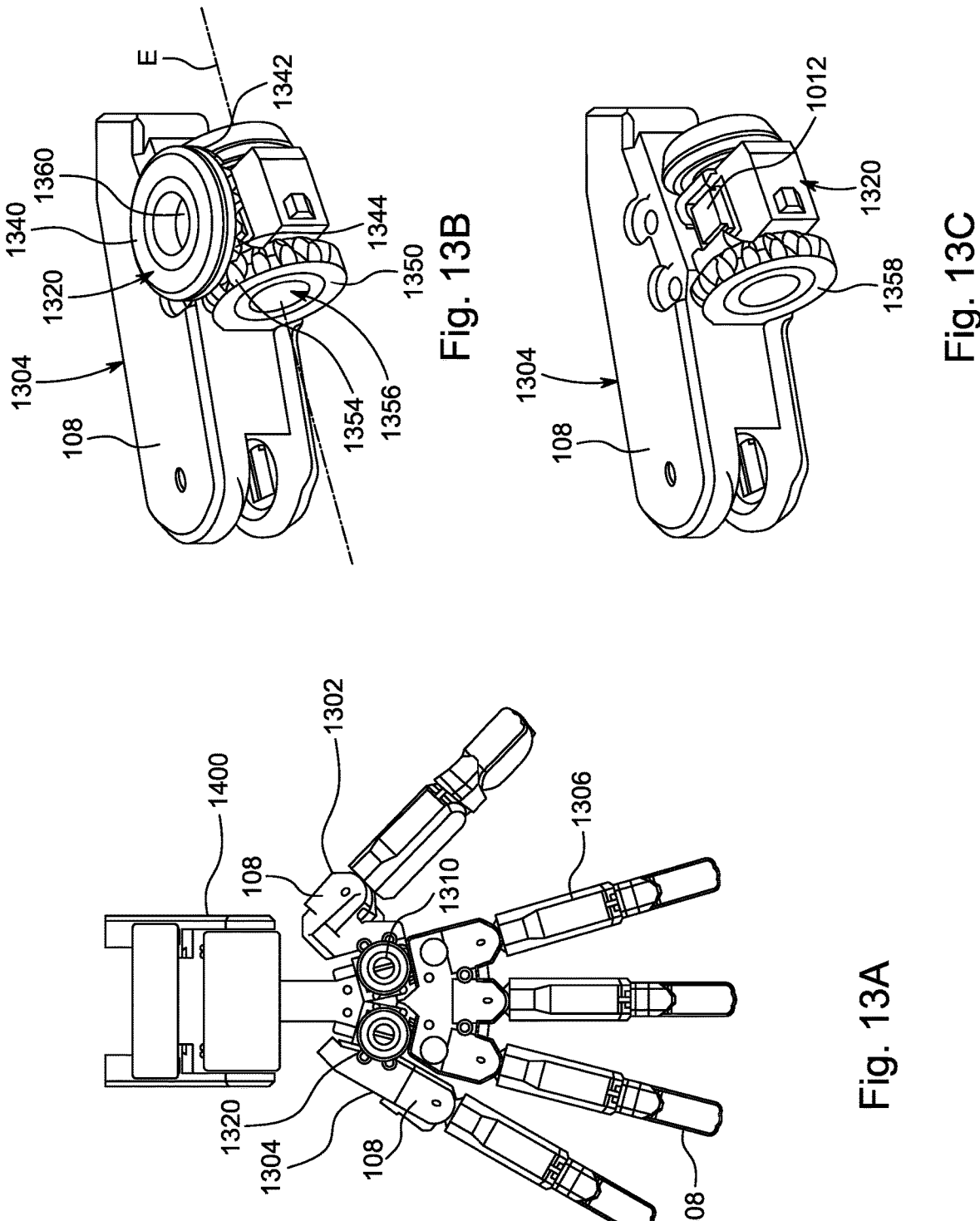
FIG. 13A is a partially assembled view of a hand, showing thumb and pinkie joints and thumb and pinkie joint rotational position sensors, according to an illustrative embodiment.
FIG. 13B is a detailed view of a pinkie joint of FIG. 13A, showing an arrangement of bevel gears, according to an illustrative embodiment.
FIG. 13C is a detailed view of the pinkie joint of FIG. 13B, showing a rotational position sensor within the joint, according to an illustrative embodiment.

As shown in FIGS. 12A and 12B, the symmetrical circuitry unit 1202 can be folded with the pinkie in a first conformation and the thumb folded in a second conformation, resulting in an asymmetrical hand with an opposable thumb. FIG. 13A is a partially assembled view of a hand, showing thumb and pinkie joints and thumb and pinkie joint rotational position sensors, according to an illustrative embodiment. Thumb 1302 is positioned further back on the hand, closer to the wrist 1400. In addition to the various finger joints described above, thumb 1302 and pinkie 1304 have an additional joint that allows them to pivot inward in a direction that is into the page, when looking at FIG. 13A. That is to say, pinkie 1304 and thumb 1302 can be bent inward towards the bottom of the hand in a direction that allows the opposable thumb to help to grip objects in conjunction with other fingers. The pinkie 1304 can also pivot inwards towards the bottom of the hand in a direction that allows the pinkie 1304 to help grip objects in conjunction with other fingers. A pair of bevel gears can be used to translate the movement of tendons to the inward pivoting of the pinkie and thumb.

FIG. 13B is a detailed view of a pinkie joint 1320 of FIG. 13A, showing an arrangement of bevel gears, according to an illustrative embodiment. The top bevel gear 1340 can have a tendon track 1342 that accommodates a tendon that can connect to a servo in the arm. Top bevel gear 1340 also has gear teeth 1344 that engage with gear teeth 1354 in the bottom bevel gear 1350. As the tendon rotates the top bevel gear, the movement of the tendon is translated to the bottom bevel gear, which then causes the base 108 of the pinkie 1320 to rotate around axis E. A hollow canal 1356 can extend through the joint 1320, and the hollow canal can allow the FCB and tendons of the finger to pass through the center of the joint. Similar to other joints, the hollow center of the joint allows the FCB to pass through the joint with minimal bending of the FCB as the finger is moving. The pinkie joint 1320 can be aligned behind the ring finger 1308 and directly in line with the ring finger 1308, so that the FCB and tendons of the ring finger can pass through the center of the pinkie joint 1320. The thumb joint 1310 can have similar construction, with a hollow canal, and can be aligned behind the index finger 1306 and directly in line with the index finger 1306, so that the FCB and tendons of the index finger can pass through the center of the thumb joint 1310.

A diametrically magnetized magnet 1360 can be embedded inside the top bevel gear 1340, and acts as a reference for the rotational encoder within the joint 1320. FIG. 13C is a detailed view of the pinkie joint of FIG. 13B, showing a rotational position sensor within the joint, according to an illustrative embodiment. Rotational position encoder 1012 can detect the rotational position of magnet 1360 within top bevel gear 1340. As the top bevel gear turns, and thereby turns the lower bevel gear and causes the pinkie base 108 to rotate around axis E, the rotational position encoder 1012 can detect the rotational movement of the diametrically magnetized reference magnet within the top bevel gear. In this way, the rotational position encoder 1012 is able to detect the rotational position of the joint 1320 while still allowing the center of the joint to remain hollow. Similarly, the thumb 1302 has a thumb joint 1310 that operates under the same principles, including a pair of bevel gears, and a rotational position encoder that detects the rotational position of a reference magnet embedded within a bevel gear.

14A is a perspective view of the wrist of FIG. 9, showing the hollow central channel that can accommodate tendons and FCBs, according to an illustrative embodiment. Wrist 1400 can use a universal joint 1412 that can allow for side-to-side yaw movement around axis F, and up-and-down movement around axis G. A hollow central canal 1402 allows various tendons and FCB from the hand to pass through the center of the wrist, including passing through axis F and axis G. Allowing the FCB to pass through the center of the wrist reduces the strain on the FCB as the various joints are moving. An outer support structure 1404 can hold all of the various components within the wrist in place.

FIG. 14B is a perspective view of selected components within the palm of FIG. 12B and the wrist of FIG. 14A, showing bevel gear components, according to an illustrative embodiment. The universal joint 1412 can have a right side bevel gear 1422, a top bevel gear 1424, and a left bevel bear 1426. As used herein, the labels left, top, and right are used for clarity and simplicity of explanation, and are not intended to refer to any absolute direction. The right side bevel gear 1422 can have a tendon track 1428 and tendon attachment points 1430. Tendons can be routed around the track and connect between the attachment points 1430 and servos, so that the servo in a different location, such as the arm, can rotate the right side bevel gear 1422. Similarly, the left side bevel gear 1426 can have a tendon track and tendon attachment points, so that the left side bevel gear can also be powered by a servo in a different location, such as the arm. Tendons can pass through the central canal 1402 to connect to servos that can be located in the arm.

When both the left side bevel gear and the right side bevel gear are rotated in the same direction around axis G, the wrist rotates in that direction around axis G. When the left side bevel gear is rotated in a first direction around axis G, and the right side bevel gear is rotated in the opposite direction around axis G, the wrist rotates around axis F. The loops folded into the FCB at the wrist allow the wrist to bend in different directions without pulling on or causing strain on the FCB.

FIG. 14C is an exploded view of the left bevel gear and outer structure of the wrist of FIG. 14B, showing a rotational position sensor; according to an illustrative embodiment. Turning to FIGS. 14A, 14B, and 14C, the bevel gear 1426 can include a clip 1446 that holds the rotational position encoder 1018 in place on axis G. An insert 1448 can help to hold the rotational position encoder 1018 in the clip 1446. Diametrically magnetized magnet 1450 can be mounted in the side arms 1406 so that the rotational position encoder 1018 can sense the rotational position of the magnet 1450, and therefore sense the rotational position of the bevel gear 1426. The rotational position encoder 1018 and magnet 1450 form a rotational position sensor 1452 that is on axis with axis G.

Wrist 1400 can have two rotational position sensors located within any two of the three bevel gears. By sensing the rotational position of any two out of the three bevel gears, the processor can determine the rotational position of the universal joint around both the F axis and the G axis. In various embodiments, rotational position encoder 1016 and rotational position encoder 1018 can be on the left and right, or the left and top, or the top and right bevel gears. A rotational position sensor located within the top bevel gear can be on axis with axis F.

The flexible printed circuit can be made with standard manufacturing processes including automatic IC assembly. The circuit parts can then cut from the production sheet and folded around the palm structure, including passing through a hole in the structure in order to place sensors on both sides of the palm. The hall effect, on-axis, position encoders on the joint axis can detect the position of the radially polarized magnets embedded in the actuated segments. In order to achieve this positioning, slots are designed in the structural pieces which hold the circuit in its proper position. The finger circuits can be similarly folded and assembled together with the structural segments of the fingers. For the fingers plastic clips can affix the circuit in their corresponding slots. Because the finger bends at multiple joints, strain relief loops included in the circuit design can help to accommodate the bending. Starting from the fingertip the circuit can assembled in its slot and a plastic clip can fix it in place. The fingertip halves can be brought together and the force sensors can be folded to cover the outside of the fingertip. The fingertip can then be covered in aluminum foil to shield the force sensors from detecting proximity and then covered by a flexible plastic skin. The circuit can be knotted around the linkage bar to keep it securely in position during finger movements. The circuit can be routed very close to the joint axis thus minimizing bending, and the circuit can include a strain relief loop to release strain on the FCB. The circuit can be placed in the slot in the proximal segment and clipped in place. The final section of the fingertip circuit can be bent around to form the relief loop for the knuckle. The circuit can pass straight through the middle of the knuckle minimizing bending during finger movement. Additionally this circuit strip that passes through the knuckle can be split into two to further increase bending allowance, especially needed because the knuckle allows movement in 2 orthogonal axes. The end of the finger circuit strip can include a printed connector to the palm circuit. In order to accommodate assembly the end can be longer then required and will be folded up after connecting and attaching the finger to the palm. This can create a very compact sensor circuit made of few modular pieces that cover the multitude of moving segments in the robot hand with sensors. This eliminates the need to attach additional wires as the circuits themselves are the wires and the connectors. The on-axis position encoders provide very accurate position feedback which is also robust to external magnetic fields because of the proximity of the reference magnet to the detecting IC. Because of the accurate position feedback and on-axis encoders on each joint this allows us to measure torque in the fingertip using a 4 linkage mechanism.

FIG. 15A is a method of manufacturing a robotic finger, according to an illustrative embodiment. At box 1502, the finger circuitry can be printed and the IC components and connectors can be placed and soldered onto the FCB. All soldering can be performed at the PCB manufacturing facility. No additional soldering is required for the rest of the manufacturing process, and circuits can be clipped directly into position during manufacturing of the finger. At box 1504, a compressible dielectric pad can be applied to an electrode of a capacitive force sensor of the FCB, and the two unitary electrodes of the capacitive force sensor can be folded together around the compressible dielectric pad to form a capacitive force sensor that is a unitary part of the FCB. At box 1506, attach the tendons to the structural pieces for the finger so that they can pull and cause the structural pieces to move. At box 1508, fold the circuit roughly into shape. Bend the circuit to form the strain relief loops that lead to the fingertip and knuckle. At box 1510, the knot segment can be pre-folded so that it can create a tight loop around the flex rod. At box 1512, tie the circuit using a simple knot around the flex rod that connects to the fingertip mechanism. Secure the knot with the tabs on the FCB. At box 1514, fold the fingertip part of the circuit and insert it into the side of the fingertip with space for the rotational position sensor. At box 1516, slide the circuit into the fingertip ensuring both the rotational encoder and the force sensor on the same side go into their corresponding positions. At box 1518, fix the circuit in place with the clip for the fingertip rotational encoder. At box 1520, add the bearing to the other side of the fingertip structure. At box 1522, reference magnets for the rotational encoders can be press fit, or otherwise attached to the joints. This can include pressing two reference magnets into the middle segment to be reference magnets for the rotational position encoders for the distal and middle joints. At box 1524, pass the circuit through the middle segment. At box 1526, the middle segment can be inserted into the side of the fingertip with the bearing, and slide the fingertip over the circuit. At box 1528, insert the flex rod for the 4-bar linkage and torque sensor, and ensure the FCB is properly routed through the inside of the finger tip and joints. At box 1530, hold the sensors in place, and wrap the aluminum foil shield around the sensors. Tape can be used to hold the foil in place. At box 1532, cover the fingertip with the flexible plastic skin. The skin should cover the foil, hold the sensors tightly around the finger bone, and hold the fingertip halves together. At this point, the fingertip is complete, and the circuitry with the rotational position sensors for the middle segment can be dangling from the fingertip. At box 1534, insert the circuit into the proximal segment with space for the rotational position encoders, and fix the rotational position sensors in place with the clips. The circuit can now be sticking out of the proximal segment from two ends, and the ends can have 90 degree turns in the circuit to align the circuit with the knuckle and middle segment channels. At box 1536, form the strain relief loop between the fingertip and the proximal segment. At box 1538, bring the fingertip and middle segment assembly over the proximal segment, checking that the relief loop sits freely in the middle of the proximal segment. At box 1540, connect the flex rod to the proximal segment. At box 1542, press fit, or otherwise attach the reference magnets into the knuckle segment for the proximal joints for axes C and D. At box 1544, the double stranded segment of the FCB can be routed through the canal through the knuckle segment. At box 1546, form a strain relief loop between the proximal segment and the knuckle segment, also called the base, by bending the circuit while holding the base and the proximal segment. At box 1548, align the knuckle with the proximal segment, ensuring that the circuit loops are in the correct position and free to move freely down the middle of the proximal segment. At box 1550, pass the tendons that drive the fingertip though the knuckle canal alongside the circuit. The tendons and FCB can be routed through the centers of the knuckle joints and through the axes C and D. The tendons can pass between the two circuit strands when both the circuit and tendons are in the correct positions. At box 1552, insert bearings into the other side of the proximal segment. At box 1554, with all the pieces aligned and the circuit folded into the correct shape, press the other side of the proximal segment over the assembly. The 4-bar linkage fingertip mechanism is now complete. The fingertip, middle segment, and proximal segment rotate together when the tendon is pulled to rotate the fingertip. One of the two knuckle joints, also referred to as one of the two joints between the base and the proximal segment, is now complete, and the finger can move up and down. At box 1556, slide the flexible skin over the proximal segment, thereby holding both halves together. Fold the middle segment skin over the middle segment. The fingertip is now complete. The other joint of the knuckle (the yaw joint), will be completed when the finger is assembled into the palm, explained below. At this point, the FCB can be sticking out of the knuckle and is ready to be connected to the palm circuit using an FPC connector. The tendon that drives the fingertip can also be sticking out of the knuckle segment, and the tendons that drive the knuckle joints (yaw and pitch motions) can be dangling outside and around the knuckle segment.

FIG. 15B is a method of manufacturing a robotic hand, according to an illustrative embodiment. At box 1558, the palm circuitry can be printed and the IC components and connectors can be placed and soldered onto the FCB. All soldering can be performed at the PCB manufacturing facility. No additional soldering is required for the rest of the manufacturing process, and circuits can be clipped directly into position during manufacturing. At box 1560, a compressible dielectric pad can be stuck to an electrode of a capacitive force sensor, and the two electrodes of the capacitive force sensor can be folded together around the compressible dielectric pad to form a capacitive force sensor. At box 1562, the FCB can be bent approximately into the shape it will be in within the palm. At box 1564, insert the palm FCB into the palm structure or palm bone. At box 1566, align the rotational position encoders into the correct position on the palm structure. At box 1568, align the capacitive force sensors into the correct position on the palm structure. At box 1570, route the pinkie circuit and thumb circuit along the sides of the palm and insert into the bottom structure of the pinkie base and the thumb base. The rotational position encoders can be positioned for the thumb and pinkie bases. At box 1572, the front of the palm circuit can pass through a hole in the palm to the bottom side of the palm. Folded loops can allow the FCB to extend during the process of manufacturing and connecting to fingers, and then the FCB can be tucked into a compact design with the loops within the palm structure. At box 1574, the three finger connector circuit segments can be arranged on the bottom of the palm structure, and the force sensors can be placed in position on the bottom of the palm structure. At box 1576, the rotational position encoders on the FCB can be placed within the bevel gears of the wrist, and the three bevel gears can be enmeshed together. Reference magnets can be placed in the side arms of the wrist, and the side arms can be inserted into the wrist support structure. At box 1578, ensure the gimbal structure of the strain relief loops of the FCB and the bevel gears all move freely and independently with respect to the side arms. At box 1580, the bearings for the finger bases can be pressed into the palm structure. At box 1582, the fingers bases can be inserted into the bearings, and the tendons of the finger can be passed through the tendon holes of the palm structure and palm FCB. The finger circuits can be passed through the channel At box 1584, the finger circuits that can be dangling from the bottom of the hand can be connected to the palm connectors that can be dangling from the bottom of the hand. At box 1586, the finger circuits can be folded into place with strain relief loops, and the bottom portions of the palm, pinkie, and thumb can be attached and screwed in place. At box 1588, attach the tendons to the bevel gears of the wrist. At box 1590, align the pegs of the top cover of the palm with the capacitive force sensors on the top of the palm, and attach the top cover of the palm to the palm so that the pegs can press against the capacitive force sensors. At box 1592, attach the flexible bottom cover of the palm, making sure the capacitive force sensors are aligned with the corresponding indents. In various embodiments, a sheet of metal foil, such as aluminum foil, can be adhered to the inside of the palm cover to shield the capacitive force sensors from environmental electrical noise. At box 1594, connect the circuits of the hand to the processor of the robot. At box 1596, connect the tendons from the hand to servo motors within the arm.

FIG. 16 is a method of sensing force using a capacitive sensor, according to an illustrative embodiment. At box 1602, press against a capacitive force sensor with Newtonian force. Pressing against the capacitive force sensor includes pressing a first electrode towards a second electrode and compressing a compressible dielectric pad between the two electrodes. At box 1604, compressing the pad causes the two electrodes to become closer to each other which changes the capacitance between the two electrodes. The capacitive signal from the capacitive force sensor changes in response to the change in capacitance. At box 1606, process the capacitive signal at an Integrated Chip (IC) into a digital signal. At box 1608, transmit the digital signal to a processor. At box 1610, using the processor, calculate the force on the capacitive sensor. In various embodiments, calculating the force can include interpolating between calibration points. Calibration points can be obtained by placing a test weight with a known weight on the capacitive sensor and recording the capacitive sensor readout and a calibration point. Multiple weights can be used to create multiple calibration points, and the multiple calibration points can be used by the processor to interpolate between calibration points. In an embodiment, the processor can calculate the force as equal to a scale factor x capacitive reading+ calibration offset.

FIG. 17 is a method of sensing force using rotational position sensors, according to an illustrative embodiment. At box 1702, read the rotational position of a first joint. At box 1704, read the rotational position of a second joint. At box 1706, compute the length of the linkage bar, based on the known rotational positions and the lengths of the rigid segments, with a processor using inverse kinematics. At box 1708, compare the actual length of the flexible segment to the length of the flexible segment when it is relaxed in a no-load condition. At box 1710, calculate the torque being applied to the finger from the length difference between the flexible segment length now and the flexible segment length under the no-load condition. The torque can be calibrated by hooking known weights from the fingertips.

FIG. 18 is a schematic view of a robot control processor, according to an illustrative embodiment. The robot control processor 1800 can be connected to the hand through one or more FCBs that can be routed through the wrist. The robot control processor can have a capacitive force sensor module 1802 that can determine the quantity of force applied to a capacitive force sensor. A capacitive sensor 1832 can be connected to the capacitive force sensor module 1802 of the processor 1800. In various embodiments, an optional multiplexer can be connected to multiple capacitive force sensors, so that the connections from multiple capacitive force sensors can pass through the multiplexer and be connected to the capacitive force sensor module 1802. The capacitive force sensor module can calculate the quantity of force by interpolating between calibration points.

The robot control processor 1800 can have a rotational position sensor module 1804 that can determine the rotational position of a joint. A rotational position encoder can be connected to the rotational position sensor module 1804. In various embodiments, an optional multiplexer can be connected to multiple rotational position encoders, so that the connections from multiple rotational position encoders can pass through the multiplexer and be connected to the rotational position sensor module 1804. The rotational position sensor module can determine the rotational position of a joint from the rotational data provided by the rotational position encoder.

The robot control processor 1800 can have a bus 1820 that can connect various modules with each other. The robot control processor 1800 can have a torque force sensor control module 1806 that can determine the force on a fingertip from the rotational position of two joints. The torque force sensor control module 1806 can receive the rotational position of the two joints from the rotational position sensor module 1804, and can use that information to calculate the force on the fingertip.

The robot control processor 1800 can have a motor control module 1810. The motor control module 1810 can be connected to the various servo motors, and the motor control module 1810 can instruct various servo motors to move and thereby move the various joints within the hand. The processor can use the rotational position data from the rotational position sensor module 1804 to determine the rotational position of each joint as the motor control module 1810 directs the servos to move the joints. The motor control module 1810 can work together with the rotational position sensor module 1804 to accurately control the position of the fingers and hand of the robot.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, in various embodiments, the technologies described herein can be applied to any number of different shapes that do not resemble a human hand, such as various claw shapes, including axially symmetrical claws with fingers or other grippers arranged around an axis. Other shapes and arrangements are also possible. Also, as used herein, various directional and orientational terms (and grammatical variations thereof) such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances (e.g. 1-2%) of the system. Note also, as used herein the terms "process" and/or "processor" should be taken broadly to include a variety of electronic hardware and/or software based functions and components. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Accordingly, this description is meant to be taken only by way of example, and not to otherwise limit the scope of this invention.

What is claimed is:

1. A robotic component comprising:

a flexible circuit board (FCB), the flexible circuit board comprising:

at least one rotational position encoder, the rotational position encoder being on the FCB as an Integrated Chip (IC), and at least one magnet, the at least one magnet being embedded in a joint of the robotic component so that the at least one magnet and the at least one rotational position encoder are on-axis with the joint, so that the rotational position encoder can determine the rotational position of the magnet within the joint; and at least one strain relief loop that passes around a loop holder within the robotic component.

2. The robotic component of claim 1, wherein the FCB further comprises at least one bending segment, the bending segment allowing the FCB to be folded into multiple planes.

3. The robotic component of claim 2, wherein the at least one rotational position encoder further comprises at least two rotational position encoders, and wherein the FCB is bent so that a first rotational position encoder is in a first plane and measures a rotational position around a first axis, and a second rotational position encoder is in a second plane and measures a rotational position around a second axis, wherein the first axis and the second axis are in different planes.

4. The robotic component of claim 1, wherein the FCB further comprises at least one knot segment, wherein the knot segment is tied in a knot around a support within the robotic component.

5. The robotic component of claim 1, wherein the joint of the robotic component has a hollow central canal that passes through the center of the joint, including passing through the rotational axis of the joint, and wherein the FCB passes through the hollow central canal and the rotational axis of the joint.

6. The robotic component of claim 1 further comprising a 4-bar linkage system, wherein a motor that powers the movement of one joint will also power the movement of a second joint through the 4-bar linkage, and wherein a linkage bar can be semi-rigid, so that a quantity of force applied to a finger tip can be calculated from the rotational position of the two joints when the linkage bar is flexed under force.

7. The robotic component of claim 6, wherein the FCB is tied in a knot around the linkage bar.

8. The robotic component of claim 1, wherein the joint of the robotic component has a hollow central canal that passes through the center of the joint, including passing through the rotational axis of the joint, and wherein the FCB and tendons that control the movement of the robotic component are routed through the hollow central canal and the rotational axis of the joint.

9. The robotic component of claim 1, wherein the robotic component of claim 1 further comprises multiple FCBs in different portions of the robotic component, and wherein the multiple FCBs are connected together by flexible printed circuit board (FPC) connectors and are connected free of soldering or wiring harnesses.

10. The robotic component of claim 1, wherein the FCB includes holes through the FCB and wherein tendons that control the movement of the robotic component are routed through the holes through the FCB.

11. The robotic component of claim 1, further comprising at least one capacitive force sensor being unitary with the FCB, and the capacitive force sensor having two electrodes folded around a compressible dielectric pad.

12. A robotic component comprising:

a flexible circuit board (FCB), the flexible circuit board comprising:

at least one rotational position encoder, the rotational position encoder being on the FCB as an Integrated Chip (IC), and at least one magnet, the at least one magnet being embedded in a joint of the robotic component so that the at least one magnet and the at least one rotational position encoder are on-axis with the joint, so that the rotational position encoder can determine the rotational position of the magnet within the joint; and at least one bending segment, the bending segment allowing the FCB to be folded into multiple planes.

13. The robotic component of claim 12 wherein the joint of the robotic component has a hollow central canal that passes through the center of the joint, including passing through the rotational axis of the joint, and wherein the FCB passes through the hollow central canal and the rotational axis of the joint.

14. The robotic component of claim 12, wherein the joint of the robotic component has a hollow central canal that passes through the center of the joint, including passing through the rotational axis of the joint, and wherein the FCB and tendons that control the movement of the robotic component are routed through the hollow central canal and the rotational axis of the joint.

15. The robotic component of claim 12, wherein the at least one rotational position encoder further comprises at least two rotational position encoders, and wherein the FCB is bent so that a first rotational position encoder is in a first plane and measures a rotational position around a first axis, and a second rotational position encoder is in a second plane and measures a rotational position around a second axis, wherein the first axis and the second axis are in different planes.

16. A robotic component comprising:

a flexible circuit board (FCB), the flexible circuit board comprising:

at least one rotational position encoder, the rotational position encoder being on the FCB as an Integrated Chip (IC), and at least one magnet, the at least one magnet being embedded in a joint of the robotic component so that the at least one magnet and the at least one rotational position encoder are on-axis with the joint, so that the rotational position encoder can determine the rotational position of the magnet within the joint; and at least one capacitive force sensor being unitary with the FCB, and the capacitive force sensor having two electrodes folded around a compressible dielectric pad.

17. The robotic component of claim 16 further comprising a layer of foil between the at least one capacitive sensor and the outside of the robotic component, the layer of foil shielding the capacitive sensors from external capacitance.

18. The robotic component of claim 16 wherein the FCB further comprises at least one bending segment, the bending segment allowing the FCB to be folded into multiple planes.

19. The robotic component of claim 16, wherein the robotic component of claim 16 further comprises multiple FCBs in different portions of the robotic component, and wherein the multiple FCBs are connected together by flexible printed circuit board (FPC) connectors and are connected free of soldering or wiring harnesses.

* * * * *